(12) United States Patent
Gunder

(10) Patent No.: US 8,326,289 B2
(45) Date of Patent: Dec. 4, 2012

(54) METHODS, SYSTEM, AND APPARATUS FOR INTERCONNECTING DIFFERENT WIRELESS COMMUNICATION NETWORKS

(75) Inventor: Nicholas M. Gunder, Soborg (DK)

(73) Assignee: Motorola Solutions, Inc., Schaumburg, IL (US)

( * ) Notice: Subject to any disclaimer, the term of this patent is extended or adjusted under 35 U.S.C. 154(b) by 235 days.

(21) Appl. No.: 12/789,673

(22) Filed: May 28, 2010

(65) Prior Publication Data

US 2011/0294534 A1    Dec. 1, 2011

(51) Int. Cl.
*H04W 4/00*    (2009.01)
*H04M 1/00*    (2006.01)

(52) U.S. Cl. .................. 455/433; 455/432.1; 455/552.1

(58) Field of Classification Search ............... 455/426.1, 455/435.1, 445, 448, 552.1–553.1, 432.1–433
See application file for complete search history.

(56) References Cited

U.S. PATENT DOCUMENTS

| | | | |
|---|---|---|---|
| 7,136,641 B2 * | 11/2006 | Pecen et al. .................. | 455/428 |
| 2002/0090975 A1 * | 7/2002 | Laiho et al. .................. | 455/552 |
| 2002/0136226 A1 | 9/2002 | Christoffel et al. | |
| 2003/0050098 A1 * | 3/2003 | D'Agati et al. ............... | 455/561 |
| 2004/0043777 A1 * | 3/2004 | Brouwer et al. ............. | 455/466 |
| 2004/0202940 A1 | 10/2004 | Kramer et al. | |
| 2006/0079273 A1 * | 4/2006 | Gallagher et al. ......... | 455/552.1 |

FOREIGN PATENT DOCUMENTS

| | | |
|---|---|---|
| EP | 2063575 A1 | 5/2009 |
| WO | 2007092743 A2 | 8/2007 |

OTHER PUBLICATIONS

European Search Report mailed on Oct. 20, 2011 for Application No. EP11166750.

* cited by examiner

*Primary Examiner* — Steven Lim
(74) *Attorney, Agent, or Firm* — Randi L. Karpinia; Daniel R. Bestor

(57) ABSTRACT

A data interface interconnection gateway (DIIGW) is provided that interconnects to different wireless communication networks. The DIIGW implements methods for determining the network location of a mobile station from among the different wireless communication networks. The DIIGW communicates data link messages over standardized air interfaces in accordance with standardized air interface protocols using a data service that implements an acknowledgement mechanism. Depending on the implementation, the data service can be one of: a short data service (SDS), a TErrestrial Trunked RAdio (TETRA) high speed data service (TEDS), a TETRA packet data service, a short message service (SMS), general packet radio service (GPRS), a text messaging service or a wireless data link service. The DIIGW also implements at least one virtual mobile station that corresponds to a real mobile station that has migrated to a visited wireless communication network. The virtual mobile station can allow its corresponding real mobile station to continue to communicate with devices at its home wireless communication network.

20 Claims, 14 Drawing Sheets

METHODS, SYSTEM, AND APPARATUS FOR INTERCONNECTING DIFFERENT WIRELESS COMMUNICATION NETWORKS

FIELD OF THE DISCLOSURE

The present disclosure relates generally to interconnection of different wireless communication networks, and more particularly to methods for determining location of mobile stations within a system that includes two or more different wireless communication networks, and to methods for enabling communication when those mobile stations migrate to a different wireless communication network.

BACKGROUND

In the field of wireless communications, a problem that needs to be addressed relates to allowing mobile stations to continue to communicate when they migrate from their home wireless communication network to a visited wireless communication network. As used herein, the term "migrate" refers to movement of a mobile station from one wireless communication network to another, whereas roaming refers to movement of a mobile station within a wireless communication network. For example, when a mobile station that belongs to a particular wireless communication network migrates to another wireless communication network, the mobile station may be incompatible with the new wireless communication network that it has migrated to. In such situations, it would be desirable to allow a migrated mobile station to continue to communicate with its home wireless communication network over infrastructure equipment of the visited wireless communication network. For example, it would be desirable for a mobile station to be able to establish a connection to its own home wireless communication network from outside the coverage area of the home wireless network by communicating through or "over" another visited wireless communication network. When a mobile station migrates from a wireless communication network, a registration process occurs at the new wireless communication network. Registration refers to identification of a mobile station by a wireless communication network and the exchange of information between the mobile station and the wireless communication network so that the mobile station is allowed to join the wireless communication network. In many cases, after being identified, the mobile station must first be authenticated before being allowed to participate in the network.

For example, two types of wireless communication networks include public wireless communication networks, such as the Global System for Mobile Communication (GSM) system, and private mobile radio (PMR) networks, such as TErrestrial Trunked RAdio (TETRA) networks. When a PMR terminal is located in the coverage area of another wireless communication network, such as a GSM network, and registers with that other wireless communication network, the incompatibility of the PMR terminal with the other wireless communication network can prevent the PMR terminal from connecting back to its PMR wireless communication network.

One solution for interconnecting two different types of communication networks is to develop a gateway interconnecting the two communication networks. Development of such a gateway requires that the manufacturers of the infrastructure equipment used in the different communication networks collaborate to standardize the protocols, interfaces, services, and the like that are used to communicate between the two communication networks. In addition, implementation of the gateway may require changes to infrastructure equipment, development of new interfaces, and the like.

As one example, the TETRA standards body is currently standardizing an Inter-System Interface (ISI) that allows mobile stations to use a visited independent TETRA network when required. ISI allows users in one TETRA network to communicate with users in another independent TETRA network. The ISI also provides an ISI gateway that is used to interconnect infrastructure in each TETRA network.

Development of a proprietary gateway for interconnecting two networks (also called Switching and Management Infrastructure (SwMI) in the TETRA standards) can be very costly and time-consuming since the manufacturer of each SwMI must cooperate to standardize the protocols, interfaces, services, and the like that are used to communicate between the two SwMIs. In addition, the ISI gateway may require changes to each SwMI and new interfaces.

In another example, if two equipment manufacturers want to interconnect a TETRA network with a non TETRA network, (for example a GSM network), then they need to collaborate to develop another unique gateway that can interconnect between the TETRA network with the GSM network. Development of another proprietary gateway for interconnecting the two networks will require another standardization effort.

Each time two different types of networks are interconnected this standardization effort must be repeated. It would be desirable to provide a simpler solution that is generally applicable to more than two particular types of communication networks.

Accordingly, there is a need for improved methods, systems and apparatus for interconnecting different types of wireless communication networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
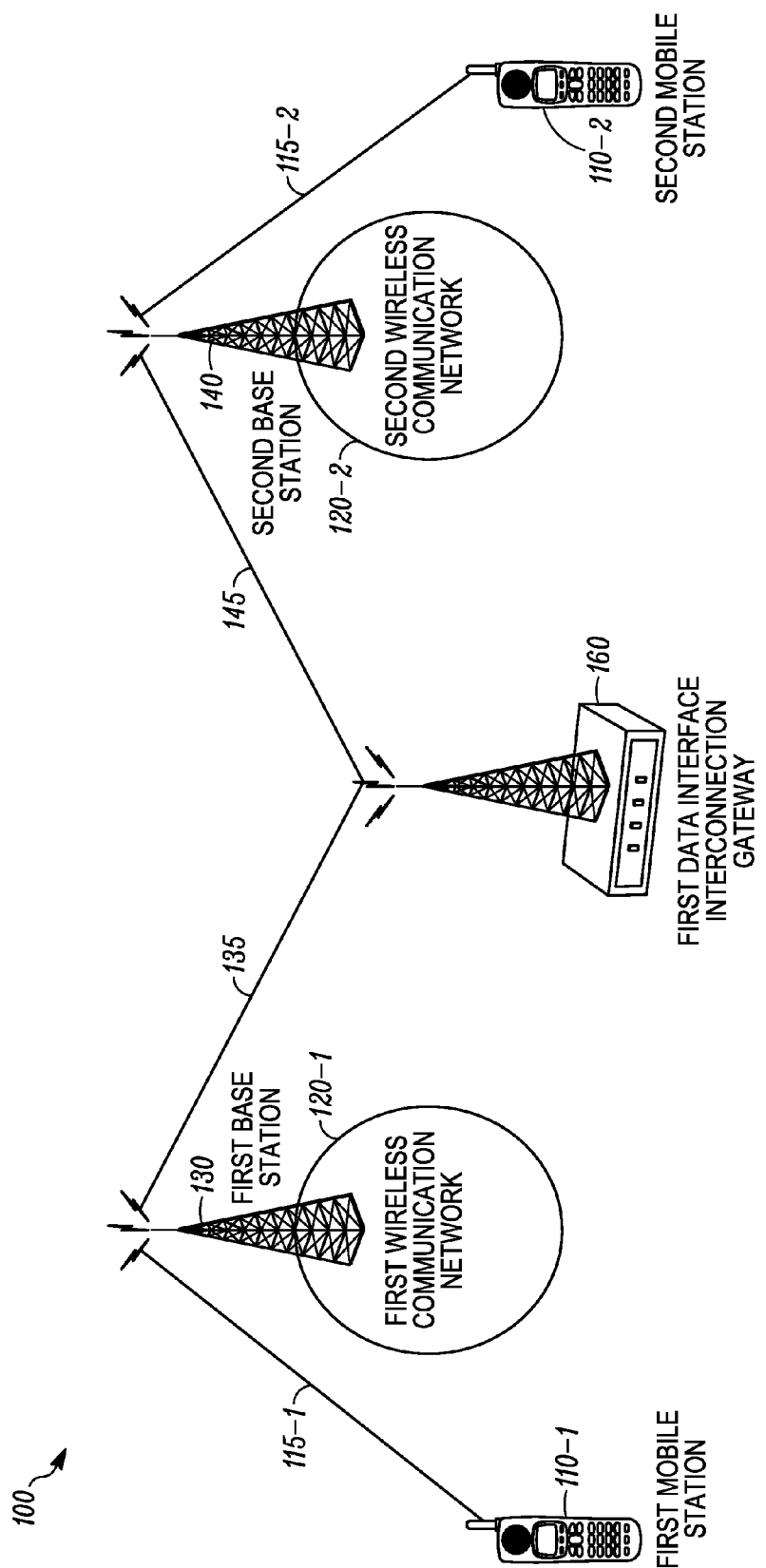
FIG. 1 is a block diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments described herein so as not to obscure the disclosure with details that will be readily apparent to those of ordinary skill in the art having the benefit of the description herein.

DETAILED DESCRIPTION

It would also be desirable to provide methods for determining location of mobile stations when those mobile stations migrate between different types of wireless communication networks. It would also be desirable to enable intersystem communication between mobile stations when those mobile stations migrate between different types of wireless communication networks. It would also be desirable to eliminate the need for custom-designed or standardized gateways that are used to connect infrastructure equipment of two particular wireless communication networks. It would also be desirable to provide group call services between the different networks. It would also be desirable to accomplish any or all of the above without any requiring major changes to the infrastructure equipment used in either system or its software.

In accordance with the disclosed embodiments, a gateway device is provided that connects two communication networks together. Throughout this document, the gateway device is referred to as a data interface interconnection gateway (DIIGW) or simply a gateway.

In some of the disclosed embodiments, methods, systems and apparatus are provided that allow for the network location of a particular mobile station to be determined For example, in one implementation, a gateway can communicate a first data link message to a first base station that operates within the mobile station's home wireless communication network, and can communicate a second data link message to a second base station that operates within a visited wireless communication network. Both the first data link message and the second data link message are destined for the mobile station. In some implementations of the first or second base station, messages can be stored and saved until the mobile station has the ability to receive the message. The first data link message and the second data link message are communicated over a standardized air interface in accordance with a standardized air interface protocol using a data service that implements an acknowledgement mechanism. For instance, in some implementations, the first and second data link messages are communicated using one of the following data services: a short data service (SDS), a TETRA high speed data service (TEDS), a TETRA packet data service, a short message service (SMS), general packet radio service (GPRS), a text messaging service or a wireless data link service. When the mobile station receives either the first data link message or the second data link message, the mobile station responds by communicating an acknowledgment message. The gateway can then determine whether the mobile station is registered with the home wireless communication network (e.g., when the acknowledgment message is communicated to the gateway via the home wireless communication network in response to the first data link message), or that the mobile station is registered with the visited wireless communication network (e.g., when the acknowledgment message is communicated to the gateway via the visited wireless communication network in response to the second data link message).

When the gateway learns that the first mobile station is located at and registered with a visited wireless communication network, the gateway provides or sets up a virtual mobile station (VMS) that corresponds to the first mobile station. The VMS has a unique identifier (e.g., mobile network identifier (MNI)) that identifies the VMS. The identifier of the VMS is different than the unique identifier that identifies the first mobile station. When the home wireless communication network receives information (e.g., a call) that is destined for the mobile station, it can send the information to the first virtual mobile station, which can then forward the information to the visited wireless communication network where the mobile station is presently located. As used herein the term "call" refers to any communication of information to or from a mobile station. A call can include audio information, video information, data, control information, signaling information, and the like.

When the visited wireless communication network receives information that originates from the mobile station (e.g., information that is destined for the mobile station's home wireless communication network), it can forward the information to the VMS at the gateway, and the VMS can then forward the information to the destination wireless communication network (e.g., the mobile station's home wireless communication network).

In some embodiments, the first base station and the mobile station communicate with each other in accordance with a first air interface protocol; whereas the visited wireless communication network includes mobile stations that communicate with its second base station in accordance with a second air interface protocol. The gateway communicates with the first base station in accordance with the first air interface protocol and is in communication with the second base station in accordance with the second air interface protocol. Depending on the implementation, the first air interface protocol and the second air interface protocol can be either the same or different.

The gateway eliminates the need for cooperation between two or more manufacturers when interconnecting infrastructure equipment of two communication networks. The gateway does so by utilizing existing, standardized air interface technologies to implement methods for determining the location of a mobile station among a plurality of different wireless communication networks.

The gateway also implements virtual mobile stations that correspond to each real mobile station that has migrated to a visited communication network to allow the real mobile station to continue to communicate with its home communication network.

Together, this eliminates the need for custom-designed gateways thus reducing development and deployment costs that would otherwise be associated with standardizing and translating proprietary protocols.

FIG. 1 is a communication system 100 in accordance with some embodiments.

The communication system 100 includes mobile stations 110-1, 110-2, a first communication network 120-1, a second communication network 120-2 different than the first communication network 120-1, and a data interface interconnection gateway (DIIGW) 160 that enables communication between the first communication network 120-1 and the second communication network 120-2.

The DIIGW 160 is associated with at least two wireless communication networks, and in some implementations more than two wireless communication networks. For example, in the example architecture illustrated in FIG. 1, the DIIGW 160 is associated with wireless communication networks 120-1 and 120-2. As will be described below, the DIIGW 160 is coupled to infrastructure equipment (that is illustrated as including a base station 130 for sake of simplicity) of the first communication network 120-1, and to infrastructure equipment (that is illustrated as including a base station 140 for sake of simplicity) of the second communication network 120-2 to enable communication between mobile stations 110 that are associated or registered with each communication network 120 when a mobile station migrates to a visited communication network. Although FIG. 1 illustrates a single DIIGW 160, depending on the implementation, the communication system 100 can include more than one DIIGW(s). One such embodiment will be described below with reference FIG. 2. When the communication networks 120 are located in the same area or in close proximity (e.g., when the base stations 130, 140 are physically located near each other), a single DIIGW can be used as shown in FIG. 1. However, in other implementations (e.g., when the communication networks 120 are separated such that the DIIGWs are not physically collocated in the same area), two or more DIIGWs can be provided that are communicatively coupled via a communication link.

The mobile stations 110 are wireless communications devices that include a radio, which may be, for example, a portable radio, a personal digital assistant, a cellular telephone, a video terminal, a portable computer with a wireless modem, or any other wireless communication device. The mobile stations 110 are also sometimes referred to in the art as subscriber units, mobile equipment, handsets, mobile subscribers, mobile nodes, or an equivalent. Each mobile station has at least one unique identifier, such as mobile network identifier (MNI), that is associated with a particular home wireless communication network for that mobile station and used by the base station (or other identifier (ID)) to identify the particular mobile station. These identifiers are unique for each wireless communication network to ensure mapping of a mobile station to its home wireless communication network.

The mobile stations 110 communicate over wireless or wired communication links 115 with infrastructure equipment (IE) (not illustrated) that is part of and that operates within a communication network 120. The IE can include various network elements, and at minimum, include base stations 130, 140. Those of ordinary skill in the art will appreciate that the communication networks 120-1, 120-2 may be any type of wireless communication network, and therefore, depending on the implementation, the IE may be referred to as a SwMI, Fixed Network Equipment (FNE) and the like. For sake of convenience, the IE are illustrated as base stations 130, 140; however, depending on the implementation the IE may include other network elements including, but not limited to, a BS controller (not shown) that controls operation of a plurality of base stations in each communication network 120, and other elements such as switches, a mobile switching center, home location register, visitor location register, a trunking resource controller, consoles, and the like, to facilitate the communications between mobile stations 100 having access to the BSs 130, 140. It will be appreciated by those of ordinary skill in the art that the IE and mobile stations 110 can be part of a wide area network (WAN) that is distributed over a wide area that spans multiple access networks.

In some implementations, the mobile stations can communicate with each other through BSs 130, 140. As is known by one of ordinary skill in the art, a base station (BS) generally comprises one or more repeater devices that can receive a signal from a transmitting mobile station over one wireless link and re-transmit to listening mobile radios over different wireless links. For example, mobile station 110-1 can transmit over link 115-1 to BS 130, and BS 130 can re-transmit the signal to listening mobile radios (not illustrated) over other wireless links (not illustrated). In addition, some types of mobile stations 110 may communicate directly with the other mobile stations using a direct mode of operation (without BSs) when they are in communication range of each other. In some implementations, when the mobiles station is within range of the DIIGW 160 but not within range of the BSs 130/140, the mobile stations can communicate with the DIIGW 160 using direct mode of operation.

Since networks 120 are wireless networks, meaning that they support a wireless or air interface protocol for signal transmission, the mobile stations and base stations, comprise transceivers that include a transmitter and a receiver for transmitting and receiving radio frequency (RF) signals, respectively. Both the mobile stations and base stations comprise one or more processing devices (such as microprocessors, digital signal processors, customized processors, field programmable gate arrays (FPGAs), unique stored program instructions (including both software and firmware), state machines, and the like.) and non-transitory memory elements operating together for performing (among other functionality) the air interface protocol and channel access scheme supported by network 120. Using these protocols, mobile stations 110 can each generate RF signals.

The base stations 130, 140 can communicate with the mobile stations 110-1, 110-2 over a wired or wireless communication link using any known air interface protocol. As used herein the term "air interface protocol" can generally describe a set of rules or agreed upon guidelines for wireless communication between two or more stations. The teachings herein can be applied with respect to any combination of two wireless communication networks and with respect any protocol utilizing wireless communication links. The teachings described herein do not depend on the type of air interface protocol or channel access scheme used, and can be applied to any type of air interface protocol and channel access scheme.

Many different types of air interface protocols are contemplated and are within the scope of the various teachings described herein, including, but not limited to, those described in: any third generation of cellular wireless standard (including those specified by the 3rd Generation Partnership Project (3GPP) standards bodies (any release), and the third generation partnership project 2 (3GPP2) standards bodies (any release)), any fourth generation cellular wireless standard (including Wi-Fi standards such as IEEE 802.11 standards and Worldwide Interoperability for Microwave Access (WiMAX) standards such as IEEE 802.16 standards), any generic access network (GAN) standards (formerly known as unlicensed mobile access (UMA) standards), any other digital radio standards (including those specified in TETRA standards, Association of Public Safety Communications Officials International (APCO) Project 25 standards, or any other similar digital radio communication standards), any land mobile radio standards, or any other proprietary wireless technology standard (e.g., Integrated digital enhanced network (iDEN)). Likewise, many different types of channel access schemes are contemplated and are within the scope of the various teachings described herein, including, but not limited to, Time Division Multiple Access (TDMA), Code Division Multiple Access (CDMA), Frequency Division Multiple Access (FDMA), and the like), or any other type of channel access scheme.

Having mentioned the wide applicability to any type of air interface protocol or channel access scheme, it is noted that in accordance with some embodiments, the base stations 130, 140 each communicate with their respective mobile stations 110-1, 110-2 using different air interface protocols and/or different channel access schemes that may have different operating bandwidths, frequencies, channelization schemes, and the like.

The DIIGW 160 is communicatively coupled to the base stations 130, 140 on their respective sides of the bridge via either wireless or wired communication links 135, 145, respectively. The DIIGW 160 serves as a virtual "bridge" used to communicate between the two communication networks 120-1, 120-2. In accordance with the disclosed embodiments, the DIIGW 160 includes physical interfaces for communicating with the base station 130, and does so using the same air interface protocol that the base station 130 uses to communicate with the mobile station 110-1. The DIIGW 160 also includes other physical interfaces for communicating with the base station 140, and does so using the same air interface protocol that the base station 140 uses to communicate with the mobile station 110-2.

In some embodiments, the air interface protocols used by the DIIGW 160 to communicate with the respective base stations 130, 140 are the same. For example, in some implementations it may be desirable to use the DIIGW to effectively split a single wireless communication network into two separate networks that utilize the same air interface protocols. However, in some other embodiments, the air interface protocols used by the DIIGW 160 to communicate with the respective base stations 130, 140 are different. For example, in one particular implementation, the DIIGW 160 and the base station 130 may communicate with one another in accordance with air interface protocols defined in the TETRA standard, whereas the base station 140 and DIIGW 160 may communicate with one another in accordance with a different air interface protocol specified in a 3GPP standard.

In some of the embodiments where the first wireless communication network 120-1 and the second wireless communication network 120-2 are different types of communication networks (e.g., GSM and TETRA), the mobile stations 110 can be dual-mode meaning that they have the ability to communicate with base stations in more than one type of wireless communication network. In this regard, the mobile station 110-1 can communicate in accordance with the air interface protocol and channel access scheme used by the base station 140 in the visited communication network 120-2. Likewise, the mobile station 110-2 can communicate in accordance with the air interface protocol and channel access scheme used by the base station 130 in the visited communication network 120-1. In other embodiments, the base stations 130, 140 are dual-mode meaning that the base stations 130, 140 can process calls communicated from the migrated mobile station in accordance with a different air interface protocol that is used by the migrated mobile station. In other embodiments, neither the mobile stations 110 nor the base stations 130, 140 are dual-mode, but rely on the DIIGW 160 to support communications between the mobile station 110-1 when it migrates to network 120-2 using a form of direct mode operation where the mobile station 110-1 communicates directly with the DIIGW 160 without communicating through the base station 130. To support direct mode operation, DIIGW 160 and network 110-2 will need to be in sufficient proximity of each other. For example, in one such implementation, link 115-1 would be linked from mobile station 110-1 to DIIGW 160 instead of base station 130, and mobile station 110-1 would access base station 130 via DIIGW 160 using a direct mode of operation that would require mobile station 110-1 and DIIGW 160 to be in close proximity to one another.

In the example illustrated in FIG. 1, the DIIGW 160 is associated with wireless communication network 120-1 and with wireless communication network 120-2; however, it will be appreciated that the DIIGW 160 can also be associated with other wireless communication networks that are not shown. As will be described below, the DIIGW 160 interconnects the two wireless communication networks 120-1, 120-2, and enables interoperability between mobile stations belong to those wireless communication networks 120-1, 120-2.

Figure 2:
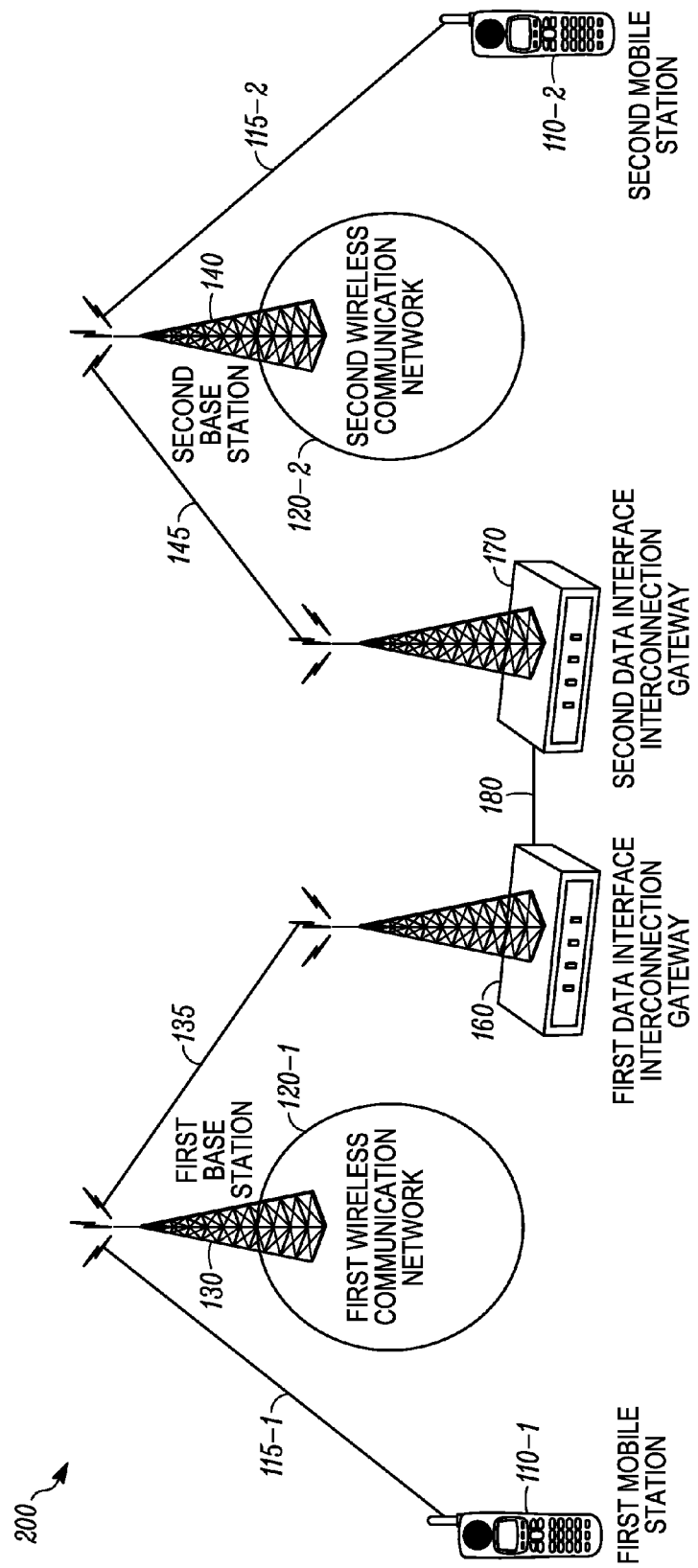
FIG. 2 is a block diagram of a communication system in accordance with some other embodiments.

FIG. 2 is a communication system 200 in accordance with some other embodiments. As in FIG. 1, the communication system 200 includes mobile stations 110-1, 110-2, a first communication network 120-1, a second communication network 120-2 different than the first communication network 120-1. For sake of brevity, the description of these elements will not be repeated here. As illustrated in FIG. 2, the first mobile station 110-1 is located at first wireless communication network 120-1 (its home network) and the second mobile station 110-2 is located at second wireless communication network 120-2 (its home network).

In this embodiment, the system 200 includes two data interface interconnection gateways (DIIGWs) 160, 170, where the DIIGW 160 is associated with wireless communication network 120-1 and the DIIGW 170 is associated with wireless communication network 120-2. As will be described below, the "first" DIIGW 160 connects to base station 130 of the first communication network 120-1, and the "second" DIIGW 170 connects to base station 140 of the second communication network 120-2. However, it will be appreciated that each DIIGW 160, 170 can also be associated with other wireless communication networks that are not shown.

The two DIIGWs 160, 170 are linked together via a communication link 180 between them. Such an arrangement might be necessary, for example, when the communication networks 120 and the base stations 130, 140 are separated from each other by a significant geographic distance. However, in other embodiments, the two DIIGWs 160, 170 can be implemented as one unit as illustrated in FIG. 1. Moreover, although two DIIGWs 160, 170 are illustrated for sake of convenience in this embodiment, in other implementations any number of DIIGWs can be provided and in communication with each other via a protocol and physical interface. The DIIGWs can be connected to each other via a wireless or wired communication link 180. The communication link 180 can be, for example, a RF communication link, a microwave communication link, an optical communication link, other proprietary communication links and the like.

As above, the DIIGWs 160, 170 are communicatively coupled to the base stations 130, 140 on their respective sides of the bridge via either a wireless or wired communication link 135, 145, respectively. The DIIGWs 160, 170 serve as a virtual "bridge" used to communicate between two communication networks 120-1, 120-2. Together the DIIGWs 160, 170 interconnect the two wireless communication networks 120-1, 120-2 and enable communication between the first communication network 120-1 and the second communication network 120-2. The DIIGWs 160, 170 also enable interoperability between mobile stations belong to the wireless communication networks 120-1, 120-2. In accordance with the disclosed embodiments, the DIIGW 160 includes physical interfaces for communicating with the base station 130, and does so using the same air interface protocol that the base station 130 use to communicate with the mobile station 110-1. Similarly, the DIIGW 170 includes physical interfaces for communicating with the base station 140, and does so using the same air interface protocol that the base station 140 uses to communicate with the mobile station 110-2. However, as noted above, depending on the implementation the air interface protocols used by the DIIGWs 160, 170 to communicate with the respective base stations 130, 140 may or may not be the same.

As will be described hereinafter with reference to FIGS. 3 through 15, each of DIIGW 160 and DIIGW 170 includes functionality that allows it to emulate a plurality of virtual mobile stations (each with its own unique identifier (e.g., mobile network identifier (MNI))) that correspond to one of the mobile stations 110. The virtual mobile stations allow the DIIGW 160 and DIIGW 170 to handle calls to or from mobile stations that are registered or associated with the first communication network 120-1 or the second communication network 120-2. When a call is made from a mobile station 110-2 that has migrated to and is registered with the first communication network 120-1, the DIIGW 160 receives the call from the first base station 130. For DIIGW 160 to receive the request, the call from mobile station 110-2 is sent to a virtual mobile station 161 registered at network 120-1 by DIIGW 160. Virtual mobile station 161 implemented at DIIGW 160 translates the call as needed, and then transmits it to the infrastructure equipment 140 (e.g., a second base station 140) via routing through another DIIGW 170 for the second communication network 120-2, whereby DIIGW 170 then contacts, and communicates to another mobile station 110-21 that is registered, or associated, with the second communication network 120-2.

Migration of Mobile Stations between Different Wireless Communication Networks

Figure 3:
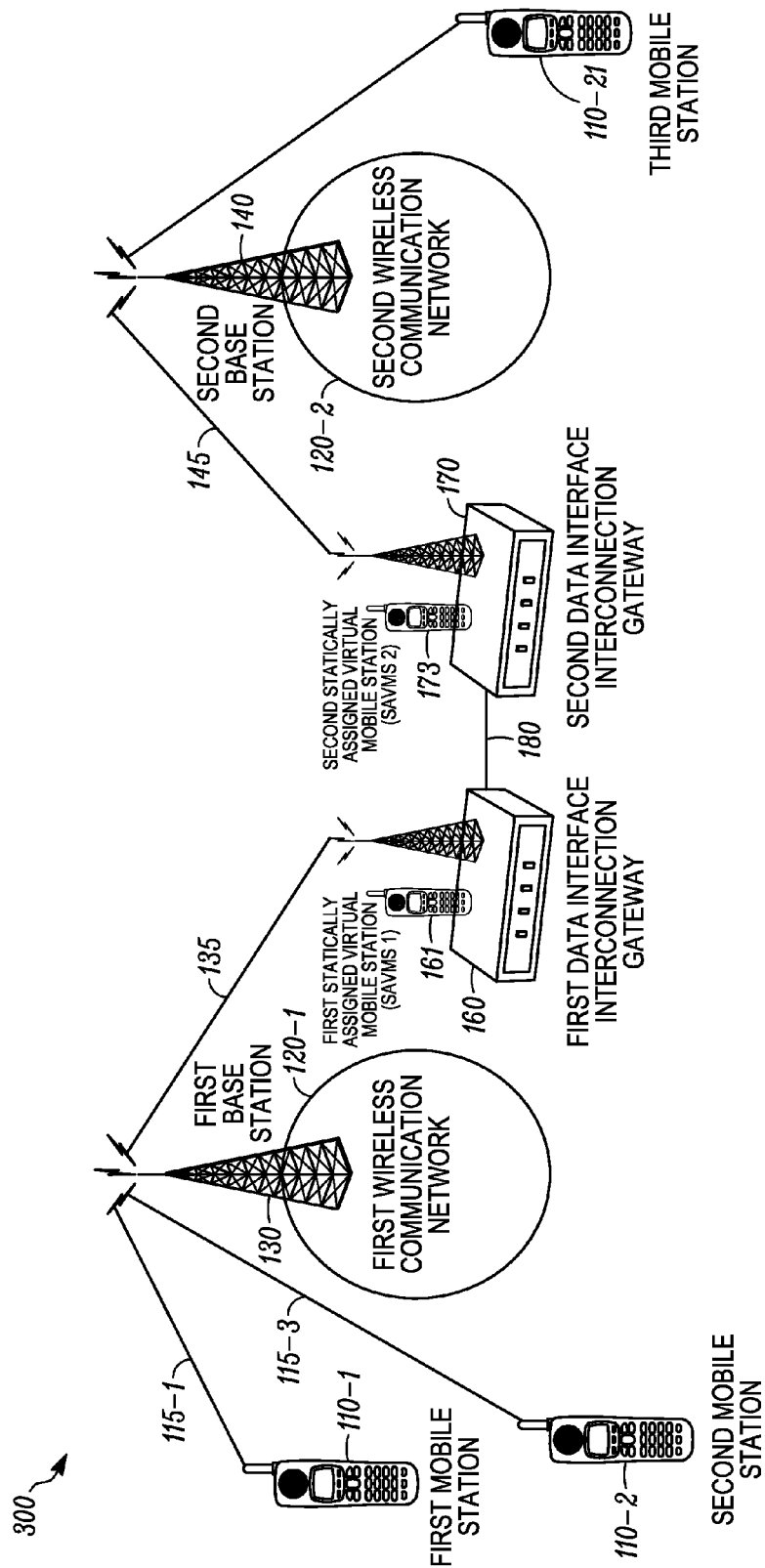
FIG. 3 is a block diagram of the communication system of FIG. 2 after the second mobile station migrates to the first communication network in accordance with some other embodiments.

In a conventional network, when the mobile station 110-2 migrates to, and registers with the first communication network 120-1 so that it is serviced by the first communication network 120-1, as illustrated in FIG. 3, the mobile station 110-2 will not have the ability to call mobile stations (or receive calls from mobile stations) in the second communication network 120-2 unless some type of interworking or interconnection apparatus is provided between the two networks 120.

As will now be described with reference to FIGS. 3 through 15, the DIIGWs 160, 170 can allow a mobile station to migrate to a visited communication network, and still maintain the ability to call other mobile stations in it home communication network. For example, the DIIGWs 160, 170 can allow mobile station 110-2, to migrate to a visited communication network 120-1, and still maintain the ability to call other mobile stations in it home communication network 120-2. To do so, the DIIGWs 160, 170 implements methods for determining the location of a mobile station, and when it is determined that the mobile station has migrated to a visited communication network, the DIIGWs 160, 170 can provide virtual mobile station functionality needed to route information between the communication networks 120-1, 120-2.

For example, after mobile station 110-2 migrates to the first communication network 120-1, virtual mobile station functionality 161, 173 at each DIIGW 160, 170, respectively, is used to route information to (or from) migrated mobile station 110-2 from (or to) the second communication network 120-2. In this manner, the second mobile station 110-2 retains its ability to call mobile stations (not shown) in its second/home communication network 120-2 and to receive calls from mobile stations (not shown) in its second/home communication network 120-2.

Before the DIIGWs 160, 170 can determine whether they need to set up virtual mobile station functionality, the DIIGWs 160, 170 first determine whether the calling mobile station or the called mobile station has migrated to a visited communication network. As such, the DIIGWs require a method for tracking the location of each mobile station and determining whether it has migrated away from its "home" wireless communication network.

Location Determination Methods for Tracking Mobility of Mobiles Stations Via Data Link Messages (DLMs)

In accordance with some embodiments, a method is provided that uses any type of existing data services to track the location of mobile stations, and to determine whether the mobile station have migrated away from their home wireless communication network to a visited wireless communication network. Examples of types of existing data services include short data services (SDS), TETRA high speed data (TEDS) or any form of packet data services provided in TETRA networks, short message services (SMS) or general packet radio service (GPRS) provided in GSM-based and other networks, any known text messaging services or wireless data link services, or any other data services that employ a recipient acknowledgement scheme such that the destination station sends an acknowledgment message upon receipt.

Data link messages (DLMs) are regularly communicated over a standardized air interface (in accordance with a standardized air interface protocol) to allow the DIIGWs 160, 170 to identify the network location of a mobile station and identify when the mobile station has moved or migrated between wireless communication networks 120. Each DIIGW 160, 170 regularly sends unique DLMs to all mobile stations that can potentially migrate to/from and register with the wireless communication network(s) the DIIGW is associated with. For example, in the system illustrated in FIG. 3, the DIIGW 160 is coupled to wireless communication network 120-1 and indirectly coupled to wireless communication network 120-2 via DIIGW 170. To identify the locations of mobile stations 110-1, 110-2, DIIGW 170 regularly sends unique DLMs to mobile stations 110-1, 110-2 that can potentially migrate from the wireless communication network 120-1 to wireless communication network 120-2. These messages will be stored at wireless communication network 120-2 so that they can be received and thus acknowledged by mobile stations 110-1, 110-2 if they migrate over to wireless communication network 120-2. The acknowledgement of DLMs are received by DIIGW 170, and forwarded to DIIGW 160. Both DIIGWs 160, 170 will update the location databases to reflect the migration.

Each DLM is destined for a particular mobile station, and is to be acknowledged upon receipt by that particular mobile station. When a mobile station receives one of the DLMs that is destined for it, that mobile station will then transmit an acknowledgement (ACK) message back to the DIIGW that transmitted the DLM via the wireless communication network associated with that DIIGW. The ACK message to confirm that the corresponding DLM arrived at the mobile station. In this manner, if that mobile station migrates to another "visited" communication network (e.g., a network different than its home network), the DIIGW associated with that visited communication network can then determine the mobile station has migrated to that visited communication network. The DIIGW can share this location information with other DIIGWs, and each DIIGW can store the location information in a mobility database, and can determine the location of any mobile station from the mobility database.

If a DIIGW does not receive an ACK message, the network 120 will drop or store the DLM. When network 120 drops the DLM, then the DIIGW needs to re-send the DLM. When network 120 stores the DLM, then the DIIGW waits a period of time for the mobile station to send an ACK message before sending another DLM.

For example, with reference to FIG. 2, the first DIIGW 160 can send DLMs to all mobile stations that belong to its corresponding network 120-1 and any other mobile stations that can potentially migrate to network 120-1. Any mobile station that receives its DLM will acknowledge (ACK) receipt by sending an SDS report or acknowledgement (ACK) message back to network 120-1. For example, with reference to FIG. 2, the first DIIGW 160 sends a DLM directly to the first base station 130 that is destined for mobile station 110-1, and the second DIIGW 170 sends a DLM directly to the second base station 140 that is also destined for mobile station 110-1. The base stations 130, 140 can then transmit the DLMs over the air to the mobile stations that are within their network. The first mobile station 110-1 will receive the DLM if it is within range of and registered/associated with the particular base station. For example, in FIG. 2, the first mobile station 110-1 is registered with the first base station 130, and will receive DLM (originated by the first DIIGW 160) from the first base station 130 and will send an ACK message back to the first base station 130, which then forwards the ACK message to the first DIIGW 160. This way, the first DIIGW 160 learns that the first mobile station 110-1 is located at and registered with the first wireless communication network 120-1. However, if the first mobile station 110-1 migrates to second communication network 120-2 and associates/registers with the second base station 140, the first mobile station 110-1 will receive the DLM (originated by the second DIIGW 170) from the second base station 140 and will send an ACK message back to the second base station 140, which then forwards the ACK message to the second DIIGW 170. This way, the second DIIGW 170 learns that the first mobile station 110-1 is located at and registered with the second wireless communication network 120-2.

Similarly, when the second mobile station 110-2 is registered with its home wireless communication network 120-2, it will receive a DLM (originated by the second DIIGW 170) from the second base station 140 and will send an ACK message back to the second base station 140, which then forwards the ACK message to the second DIIGW 170. This way, the second DIIGW 170 learns that the second mobile station 110-2 is located at and registered with the second wireless communication network 120-2. However, if the second mobile station 110-2 later migrates to first communication network 120-1, as is shown in FIG. 3, and registers with the first base station 130, the second mobile station 110-2 will receive DLMs (originated by the first DIIGW 160) from the first base station 130 and will send an ACK message back to the first base station 130, which then forwards the ACK message to the first DIIGW 160. This way, the first DIIGW 160 learns that the second mobile station 110-2 is located at and registered with the first wireless communication network 120-1. DIIGW 160 will then forward the location update to DIIGW 170 so that location database information is consistent.

Thus, when a mobile station, such as mobile station 110-1 moves or migrates from its home communication network 120-1 to another communication network 120-2 that it is visiting, the DIIGW 170 can determine that the mobile station 110-1 has migrated to communication network 120-2, and then can share the present location of mobile station 110-1 with all other DIIGWs so that the present location of mobile station 110-1 is known to all DIIGWs in the network. Similarly, when the first DIIGW 160 receives a ACK message from the mobile station 110-1, the first DIIGW 160 will be able to detect that the mobile station 110-1 has migrated back to its home network 120-2.

As such, the communication network 120 that the mobile station 110 is presently located at and registered with can be determined depending on which DIIGW receives the ACK message. Each DIIGW can collect and store information regarding which mobile stations have responded to particular ACK messages, and then use this information to determine which communication network a particular mobile station is presently located at and registered with. As will be described below with reference to FIG. 15, each DIIGW includes a mobility management module 1510; mobility management database 1512, and a mobility database synchronization module 1515. Each DIIGW can share mobile station location information with other DIIGWs, and use it to update a mobility database that stores records for each mobile station including an indication of which communication network is its home communication network and an indication of communication network the mobile station is presently located at and registered with. In one implementation, the DIIGWs regularly synchronize their mobility databases with those maintained by with other DIIGWs. This mobility database can then be used to determine which mobile stations have migrated away from its corresponding home communication network.

Call Routing Via a Virtual Mobile Station that Corresponds to a Particular Migrated Mobile Station Utilizing the determined locations of mobile stations within the system, when a mobile station migrates away from its home communication network, the DIIGW that is associated with its home communication network can provide a virtual mobile station that allows the migrated mobile station to continue to communicate even when it is located in a visited communication network. For example, the virtual mobile station allows the migrated mobile station to continue to communicate with mobile stations located in its home communication network even though the migrated mobile station is located in a visited communication network.

In accordance with some embodiments, when a DIIGW receives a migration notice from another DIIGW, that DIIGW can set-up or provision a virtual mobile station that corresponds to the migrated mobile station. When a mobile station migrates, it will continue to be represented by its own identifier when it registers with a visited wireless communication network. The DIIGW in the migrated mobile station's home communication network will provision another virtual mobile station with another identifier that corresponds to that particular mobile station. The virtual mobile station is assigned a unique identifier from a range of identifiers reserved at the DIIGW. This way the virtual mobile station is provided with its own unique identifier that is different than that of the migrated mobile station so that the particular mobile station and its corresponding virtual mobile station are assigned unique identifiers for each wireless communication network. This ensures that each mobile station/virtual mobile station pair has a unique identifier that can be used in each wireless communication network and therefore avoids identifier conflicts between the two (or more) wireless communication networks.

The virtual mobile station can then be used to route calls to or from the migrated mobile station. Calls to or from the migrated mobile station will be redirected to the virtual mobile station so that the migrated mobile station can continue to communicate even though it has migrated away from its home communication network. For example, when a call is made to or from the migrated mobile station 110-1, the call is routed from the second communication network 120-2 to a virtual mobile station at the first DIIGW 160.

In accordance with some embodiments, a virtual mobile station can be implemented at a DIIGW that is associated with the home wireless communication network that a real mobile station has migrated from. When the real mobile station has migrated away from its home wireless communication network, the virtual mobile station represents the real mobile station at its home wireless communication network. In some embodiments, statically assigned virtual mobile stations (SAVMSs) are implemented, as will be described below with reference to FIGS. 4, 6, 9, 10 and 12. SAVMSs are provisioned at every network where the mobile is not located by the DIIGW represented at that network. In other embodiments, dynamically assigned virtual mobile stations (DAVMSs) are implemented, as will be described below with reference to FIGS. 5, 7, 8 and 11. A number of DAVMSs are setup at all networks regardless of mobile station location. The DAVMSs are dynamically provisioned for specific mobile stations when the DAVMS resource is requested by the migrated mobile station and assigned by the DIIGW of the network that the mobile station migrated from.

FIG. 3 is the communication system 300 of FIG. 2 after the second mobile station 110-2 migrates to the first communication network 120-1 in accordance with some other embodiments. As illustrated in FIG. 3, the second mobile station 110-2 has migrated to and is located at the first wireless communication network 120-1 (its visited network), while the first mobile station 110-1 remains located at the first wireless communication network 120-1 (its home network). As will be described below, to allow the migrated mobile station 110-2 to continue to communicate with its home communication network 120-2, a virtual mobile station 173 is registered at home communication network 120-2 and is statically assigned to the migrated mobile station 110-2. These types of virtual mobile stations will be referred to herein as "statically assigned virtual mobile stations (SAVMS)."

Statically Assigned Virtual Mobile Station (SAVMS)

Figure 4:
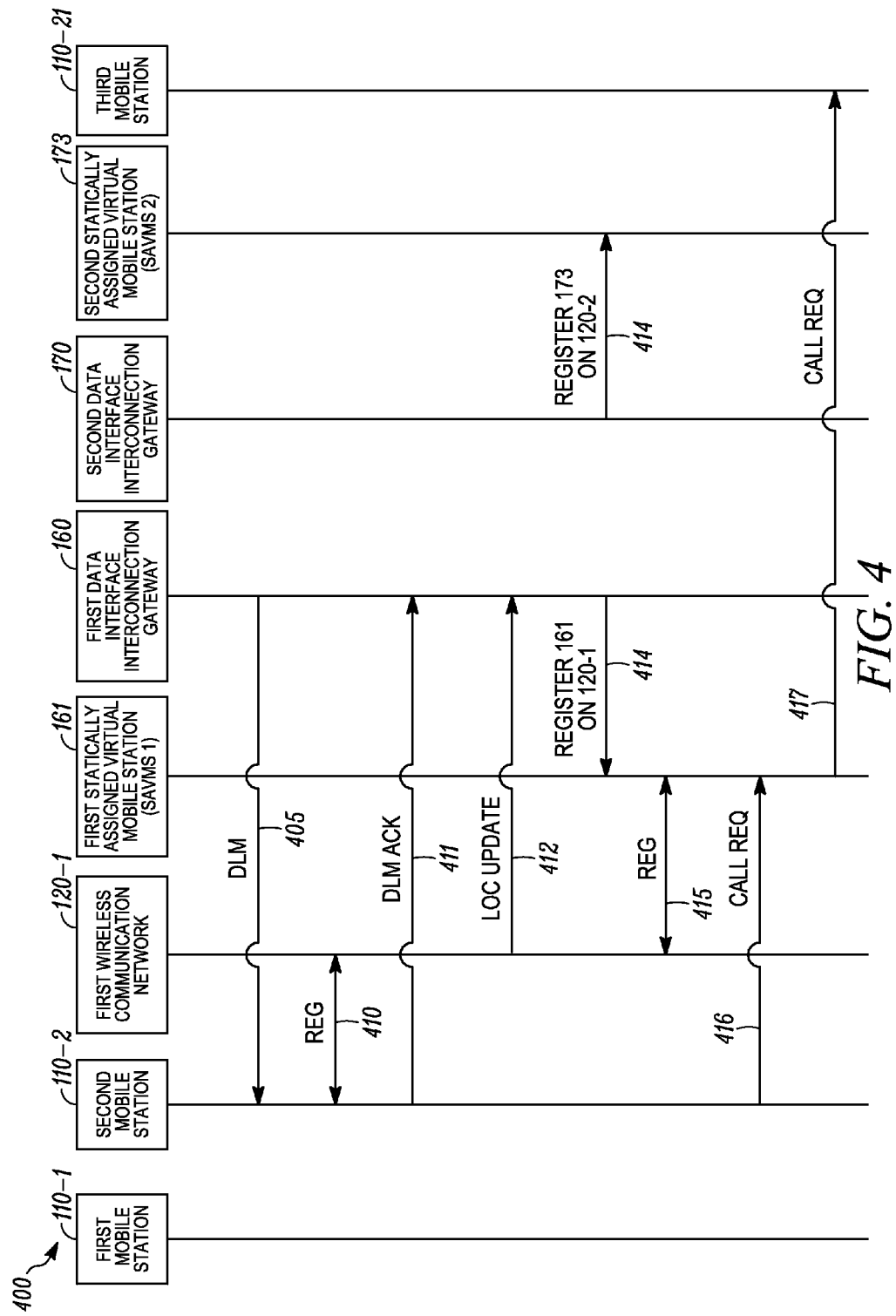
FIG. 4 is a message flow diagram that illustrates setup of a statically assigned virtual mobile stations (SAVMS) and call routing between mobile stations in accordance with some other embodiments.

FIG. 4 is a message flow diagram 400 that illustrates setup of a statically assigned virtual mobile station (SAVM) 173 and call routing between mobile stations 110-1, 110-2 in accordance with some embodiments. In FIG. 4, the second mobile station 110-2 has migrated to the first wireless communication network 120-1 (as shown in FIG. 3), and mobile station 110-2 wants to place a call to mobile station 110-1. In this example, SAVMS 2 173, that corresponds to the second mobile station 110-2, is set up at the second DIIGW 170 of its home wireless communication network 120-2 and represents it at the second DIIGW 170 while it is migrated to the first wireless communication network 120-1.

In FIG. 4, at 405, a DLM message is first sent to second mobile station 110-2 at the first wireless communications network 120-1 from the first DIIGW 160, as described previously herein. Upon migration of a second mobile station 110-2 from a second wireless communications network 120-2 to a first wireless communications network 120-1, at 410, the second mobile station 110-2 registers with the first wireless communication network 120-1. In response, the second mobile station 110-2 receives the DLM message that was sent from first DIIGW 160, triggering the 110-2 to send a DLM acknowledgement (ACK) message to the first DIIGW 160 at 411. At 412, the first DIIGW 160 sends a location update message to the first DIIGW 160. In response, at 414, two SAVMS mobiles, 161, 173, are provisioned, and at 415, the two SAVMS mobiles, 161, 173 are registered at the first wireless communications network 120-1 and the second wireless communication network 120-2, respectively. First mobile station 110-1 and second mobile station 110-2 can call each other directly using the network switching services provided by first wireless communications network 120-1 and the base station 130. Calls between first mobile station 110-1 and second mobile station 110-2 do not require first SAVMS 161 or second SAVMS 173.

As shown in FIG. 3, a third mobile station 110-21 is registered at 120-2. When the second mobile station 110-2 decides to call the third mobile station 110-21, the second mobile station 110-2 determines from a home map that the third mobile station 110-21 belongs to the second wireless communication network 120-2 and is presently located there. The second mobile station 110-2 then also determines that to communicate with the second communication network 120-2, the second mobile station 110-2 is mapped to path between SAVMS 161 and SAVMS 173 (that is set up at both the first DIIGW 160 and second DIIGW 170). Thus, to call the third mobile station 110-21, the second mobile station 110-2 dials the number for the SAVMS 161 (that is set up at the first DIIGW 160) and at 416 the call request is made between second mobile station 110-2 and SAVMS 161. After, at 417, a call request is sent to the second wireless communication network 120-2, where the request is relayed or forwarded by the first DIIGW 160 to the second DIIGW 170. One of ordinary skill in the art will appreciate that the above scenario does not describe subsequent messages that may be present in a typical call between 120-1 and 120-2

Figure 5:
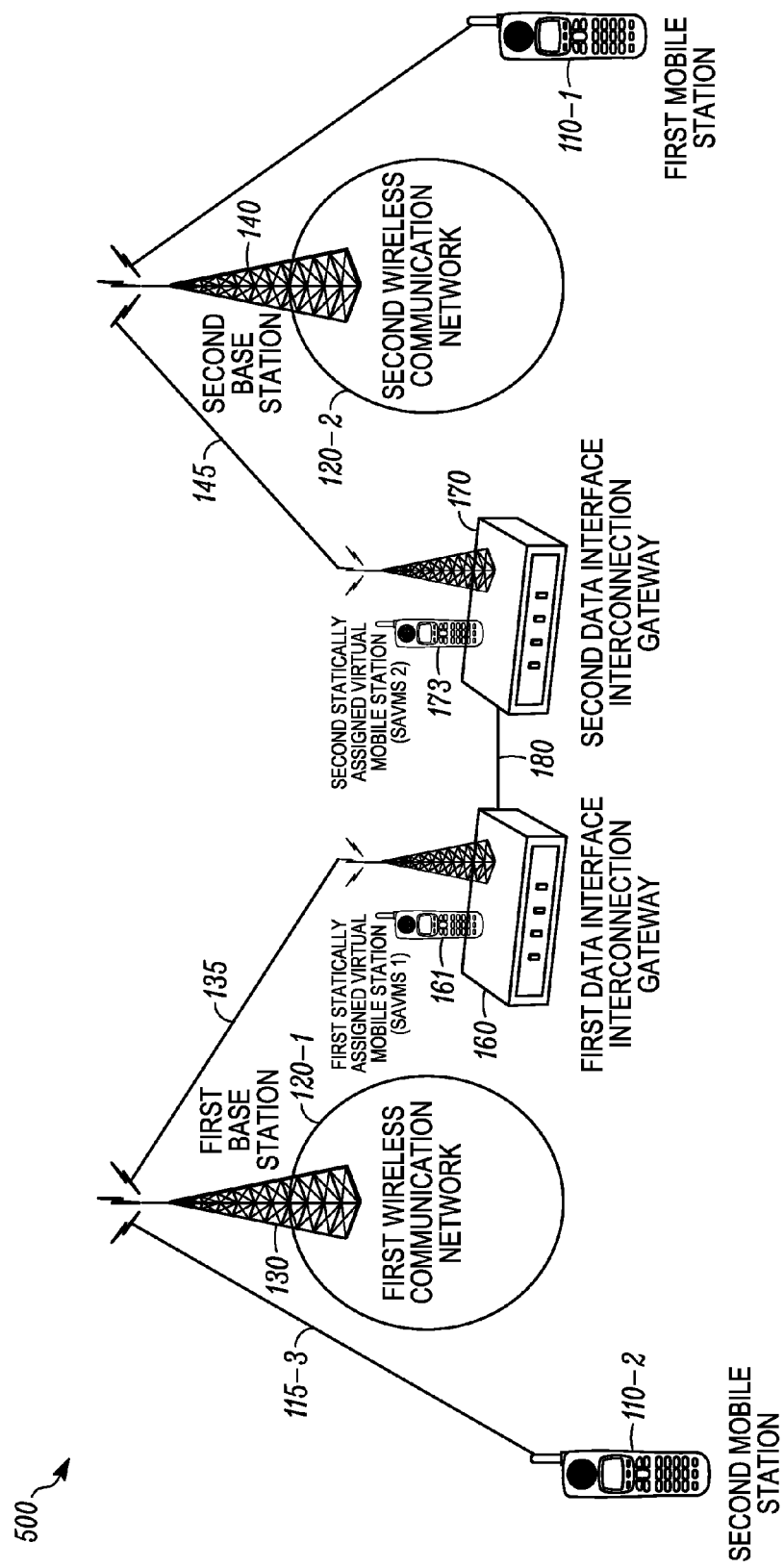
FIG. 5 is the communication system of FIG. 3 after a first mobile station migrates to a second communication network in accordance with some other embodiments.

FIG. 5 is the communication system 500 of FIG. 3 after the first mobile station 110-1 migrates to the second communication network 120-2 in accordance with some other embodiments. As illustrated in FIG. 5, the first mobile station 110-1 has migrated to and is located at the second wireless communication network 120-2 (its visited network), and the second mobile station 110-2 has migrated to and is located at the first wireless communication network 120-1 (its visited network). As will be described hereinafter, to allow the migrated mobile stations 110-1, 110-2 to continue to communicate with their home communication networks 120-1, 120-2, respectively, virtual mobile stations are statically assigned to the migrated mobile stations 110-1, 110-2. These virtual mobile stations 161, 173 are referred to herein as "statically assigned virtual mobile stations (SAVMS)."

Figure 6:
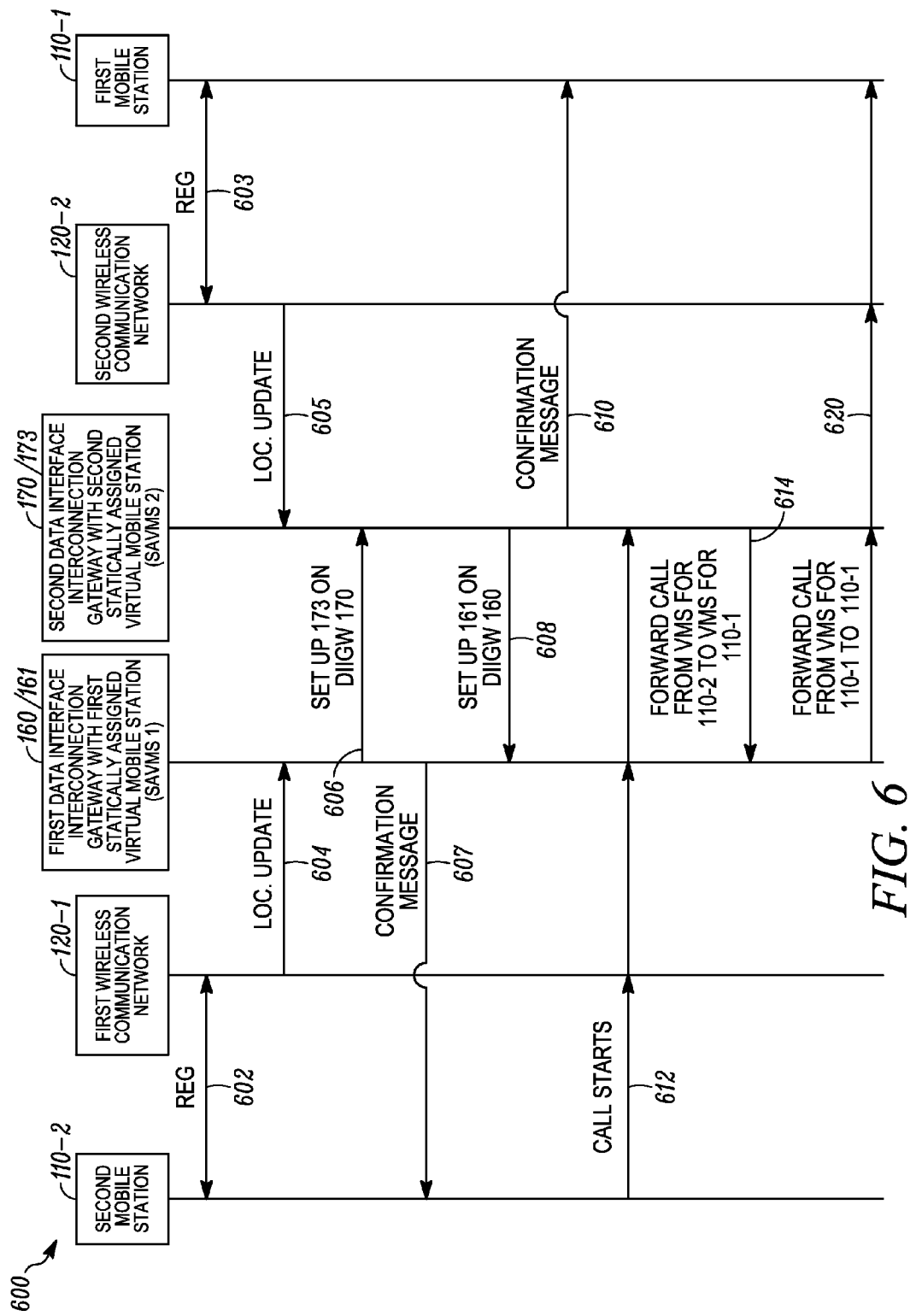
FIG. 6 is a message flow diagram that illustrates setup of statically assigned virtual mobile stations (SAVMS) and call routing between a second mobile station and a first mobile station in accordance with some other embodiments.

FIG. 6 is a message flow diagram 600 that illustrates a setup of SAVMS 161, 173 and call routing between the second mobile station 110-2 and the first mobile station 110-1 in accordance with some other embodiments. In FIG. 6, the first mobile station 110-1 has migrated the second wireless communication network 120-2 and the second mobile station 110-2 has migrated the first wireless communication network 120-1 (as shown in FIG. 5), and the second mobile station 110-2 will attempt to place a call to the first mobile station 120-1. As will be described hereinafter, the SAVMS 2 173, that corresponds to the second mobile station 110-2, is set up at the second DIIGW 170 of its home wireless communication network 120-2 and represents it at the second DIIGW 170 while it is migrated to the first wireless communication network 120-1. Similarly, SAVMS 1 161, that corresponds to the first mobile station 110-1, is set up at the first DIIGW 160 of its home wireless communication network 120-1 and represents it at the first DIIGW 160 while it is migrated to the second wireless communication network 120-2.

At 602, the second mobile station 110-2 registers with the first wireless communication network 120-1. In response, at 604, the first wireless communication network 120-1 sends a location update message to the first DIIGW 160. At 606, the first DIIGW 170 communicates the location update to the second DIIGW 170, and the second DIIGW 170 sets up SAVMS 2 173 at the second DIIGW 170. At 608, the second DIIGW 170 can then send a confirmation message to the second mobile station 110-2 to confirm that the SAVMS 2 173 has been setup and registered at the second DIIGW 170. Similarly, at 603, the first mobile station 110-1 registers with the second wireless communication network 120-2. In response, at 605, the second wireless communication network 120-2 sends a location update message to the second DIIGW 170. At 608, the second DIIGW 170 communicates the location update to the first DIIGW 160, and the first DIIGW 160 sets up SAVMS 1 161 at the first DIIGW 160. At 610, the first DIIGW 160 can then send a confirmation message to the first mobile station 110-1 to confirm that the SAVMS 1 161 has been setup and registered at the first DIIGW 160.

When the second mobile station 110-2 decides to call the first mobile station 120-1 that is located in the second mobile station's 110-2 home communication network 120-2, the second mobile station 110-2 determines from a mobility map that the first mobile station 120-1 belongs to the first wireless communication network 120-1 (e.g. the visited wireless communication network that the second mobile station 110-2 is presently in), and is presently located at the second wireless communication network 120-2 (e.g., the home wireless communication network of the second mobile station 120-2). The second mobile station 110-2 then also determines that to communicate with the second communication network 120-2, the second mobile station 110-2 is mapped to SAVMS 2 173 (that is set up at the second DIIGW 170). Thus, to call the first mobile station 120-1, the second mobile station 110-2 dials the number for the SAVMS 2 173 (that is set up at the second DIIGW 170) and the call is sent to the first wireless communication network 120-1, and then relayed or forwarded to the first DIIGW 160, which forwards the call to SAVMS 2 173 at 612. SAVMS 2 173 determines that the first mobile station 120-1 is presently located at the second wireless communication network 120-2, and relays the call to the SAVMS 1 161 at 614. At 620 the SAVMS 1 161 then relays the call to the second wireless communication network 120-2 (via DIIGW 170), and DIIGW 170 communicates the call to the first mobile station 120-1 via base station 140 of the second wireless communication network 120-2.

Dynamically Allocated Virtual Mobile Station (DAVMS)

Figure 7:
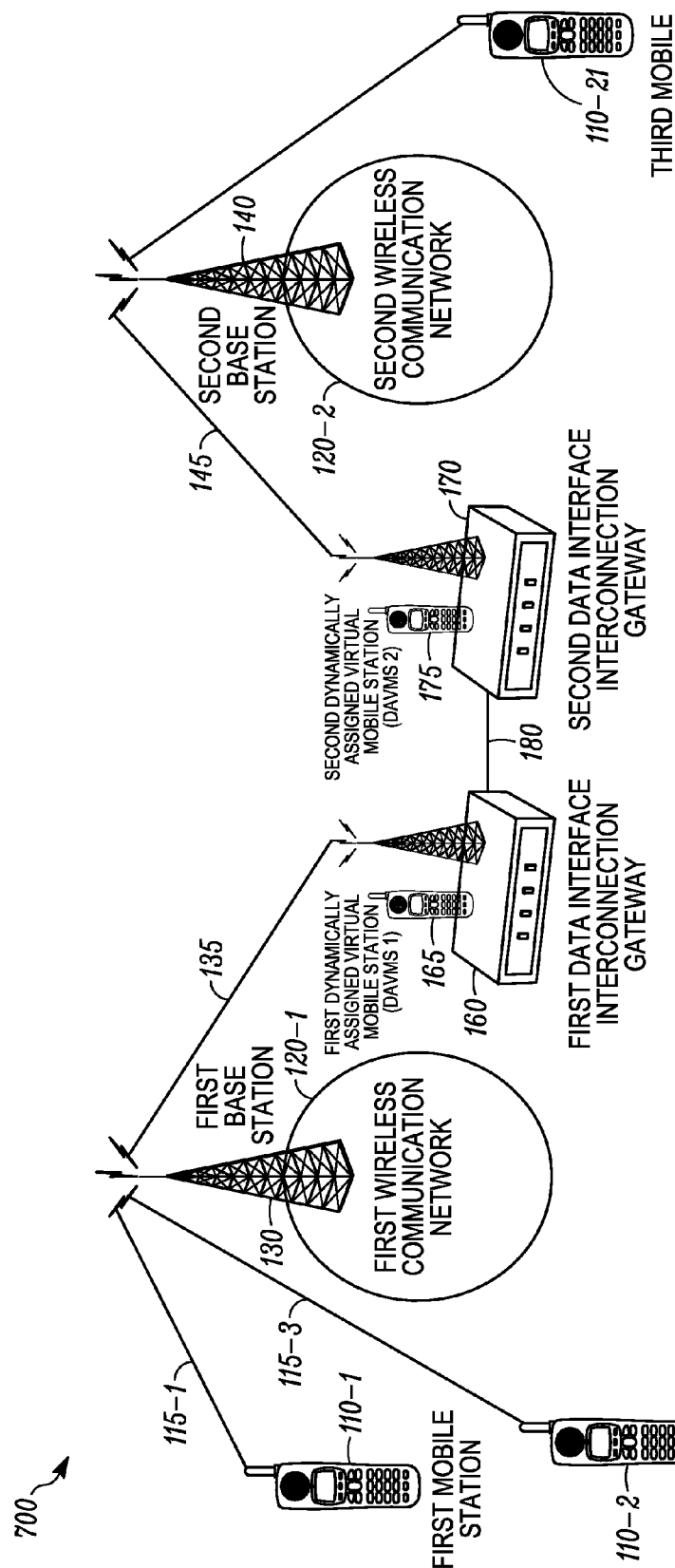
FIG. 7 is the communication system of FIG. 2 after a second mobile station migrates to a first communication network in accordance with some other embodiments.

FIG. 7 is the communication system 700 of FIG. 2 after the second mobile station 110-2 migrates to the first communication network 120-1 in accordance with some other embodiments. As illustrated in FIG. 7, the second mobile station 110-2 has migrated to and is located at the first wireless communication network 120-1 (its visited network), while the first mobile station 110-1 remains located at the first wireless communication network 120-1 (its home network). As will be described below, to allow the migrated mobile station 110-2 to continue to communicate with its home communication network 120-2, a virtual mobile station can be dynamically assigned to the migrated mobile stations 110-2. These types of virtual mobile stations are referred to herein as "dynamically assigned virtual mobile stations (DAVMS)." DAVMSs are setup by DIIGWs 160/170 as was described in the embodiments hereinbefore for SAVMS. SAVMS and DAVMS can both be used at the same time by a DIIGW.

Figure 8:
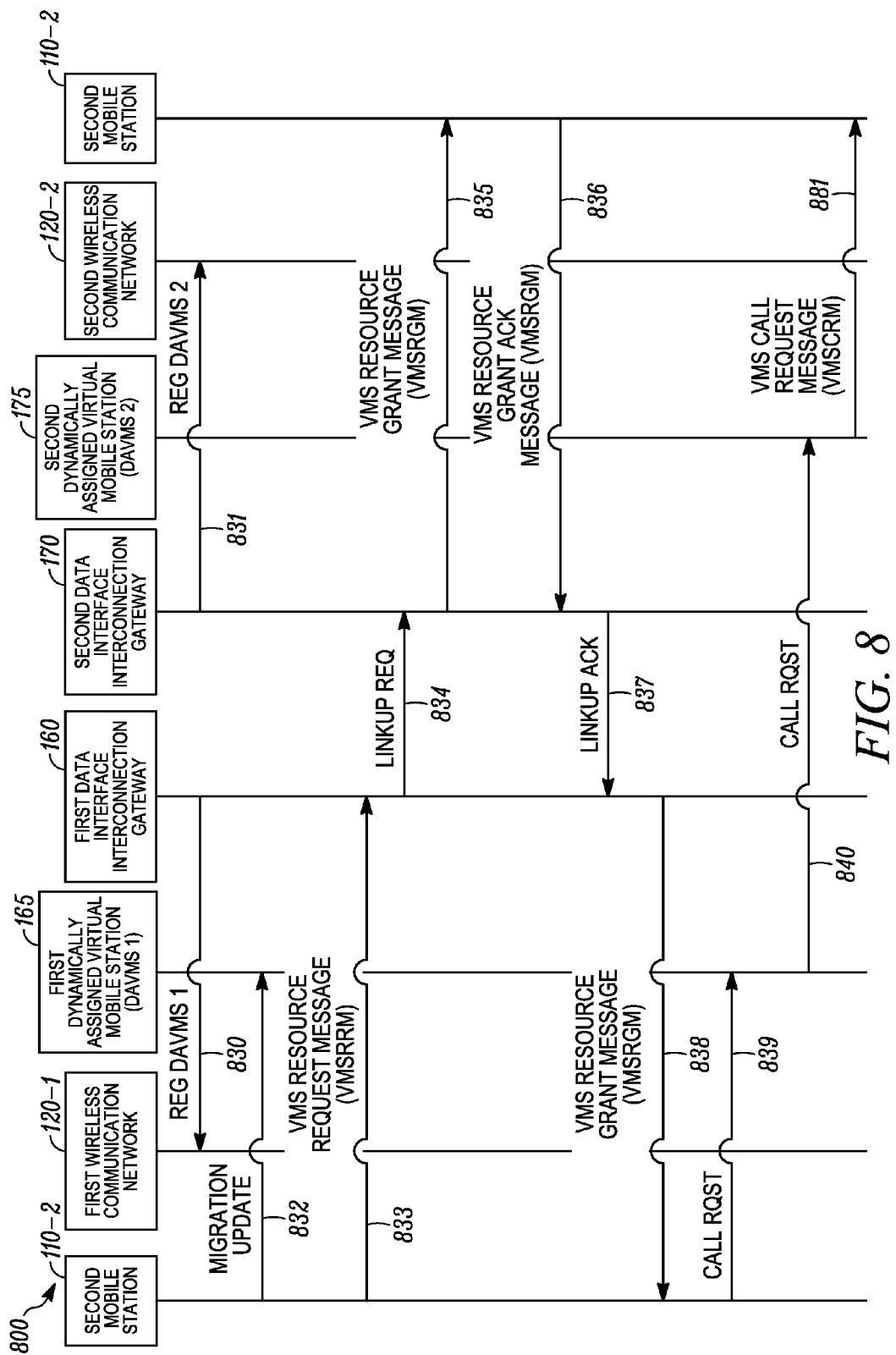
FIG. 8 is a message flow diagram that illustrates the use of dynamically assigned virtual mobile stations (DAVMSs) to bridge communications between a first wireless communication network and a second wireless communication network.

FIG. 8 is a message flow diagram 800 that illustrates the use of DAVMSs 165, 175 to bridge communications between first and second wireless communication networks, 120-1 and 120-2 respectively. As noted above, FIG. 7 illustrates a scenario after second mobile station 110-2 has migrated. Before any calls may be placed between first and second wireless communication networks 120-1 and 120-2, dynamic virtual mobile stations, represented by first DAVMS 165 and second DAVMS 175, are wirelessly registered with the infrastructure equipment that includes base station 130 and infrastructure equipment that includes base station 140 (shown in FIG. 5) via registration messages 430, 431, respectively.

At 832, mobile station 110-2 sends a migration update message to the DAVMS 165 to indicate that the mobile station 110-2 has migrated from second wireless communications network 120-2 to first wireless communication network 120-1.

At 833, the second mobile station 110-2 sends a VMS Resource Request message (VMSRRM) to the first DIIGW 160 to request a call to another mobile station 110-21 and to see if any resources are available for the call. In one embodiment, the VMSRRM can be sent via a DLM.

To determine whether resources are available, the first DIIGW 160 can identify the location of mobile station 110-21, which is the target for this call. To do this, two mobility databases are provided in DIIGW 160 which assists in location tracking. Home location register (HLR) and visited location register (VLR) databases are implemented at DIIGW 160 to assist with mobile station location tracking. Mobility maps identify the home system for each mobile station. The HLR database keeps track of all present location information. The VLR keeps track of visiting mobiles that register in a foreign system, as is the case with second mobile station 110-2 in first DIIGW 160. The DIIGW 160 can quickly contact the HLR database of DIIGW 170 to identify the location of another mobile station 110-21, which is currently at the home system. DIIGW 160 will send a message (not shown in FIG. 8) to first DIIGW 160 to update the location information needed for the call.

After determining the location of mobile station 110-21, the first DIIGW 160 can determine whether enough DAVMSs are available in first wireless communication network 120-1. At 834, the DIIGW 160 can then contact the second DIIGW 170 using linkup request message. The second DIIGW 170 will then identify if enough DAVMSs are available in second wireless communications network 120-2 for the call. If enough resources are available for the call, then at 835, the second DIIGW 170 will contact another mobile station 110-21 via a VMS Resource Grant Message (VMSRGM). The VMS Resource Grant Message (VMSRGM) indicates that the second mobile station 110-2 is the calling party, and that second DAVMS 175 is being used as a local mobile station for this call.

At 836, mobile station 110-21 can then accept the call by sending a VMS Resource Grant ACK Message (VMSRGM) back to second DIIGW 170.

At 837, the DIIGW 170 then sends a linkup acknowledgement message 837 to first DIIGW 160 to acknowledge that the call may proceed.

At 838, the first DIIGW 160 then allocates first DAVMS 165 for the call, and responds to second mobile station 110-2 by sending a VMS Resource Grant Message (VMSRGM), which indicates that the first DAVMS 165 has been allocated for this call to second mobile station 110-2.

Second mobile station 110-2 can then proceed to call another mobile station 110-21 via the first DAVMS 165 and then the second DAVMS 175. At 839, a call request message is sent to the first DAVMS 165 of the first DIIGW 160. The first DIIGW 160, upon receiving the call request message (sent at 839), forwards call request message to second DIIGW 170 of the second DAVMS 175 that is allocated to and used by mobile station 110-21.

At 841, DAVMS 175 calls mobile station 110-21 via a VMS Call Request Message (VMSCRM). As will be appreciated by one of ordinary skill in the art, further call control messages and audio will take the same paths as was the call setup message, and therefore those details will not be described further herein.

Figure 9:
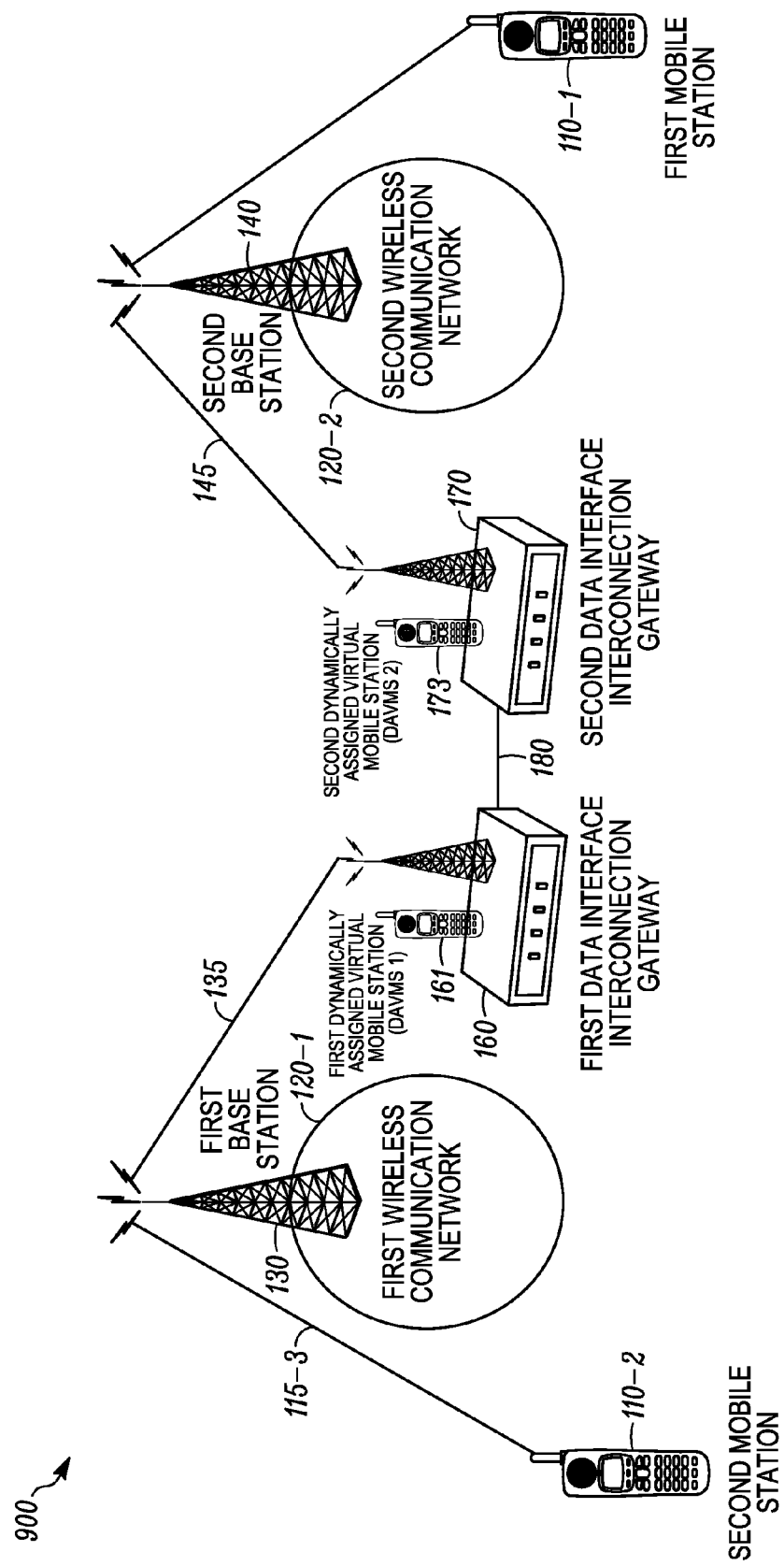
FIG. 9 is the communication system of FIG. 3 after a first mobile station migrates to a second communication network in accordance with some other embodiments.

FIG. 9 is the communication system 900 of FIG. 3 after the first mobile station 110-1 migrates to the second communication network 120-2 in accordance with some other embodiments. As illustrated in FIG. 9, the first mobile station 110-1 has migrated to and is located at the second wireless communication network 120-2 (its visited network), and the second mobile station 110-2 has migrated to and is located at the first wireless communication network 120-1 (its visited network). As will be described hereinafter, to allow the migrated mobile stations 110-1, 110-2 to continue to communicate with their home communication networks 120-1, 120-2, respectively, virtual mobile stations 165, 175 are dynamically assigned to the migrated mobile stations 110-2, 110-1. In this description, these virtual mobile stations 165, 175 will be referred to as "dynamically assigned virtual mobile stations (DAVMS)."

Figure 10:
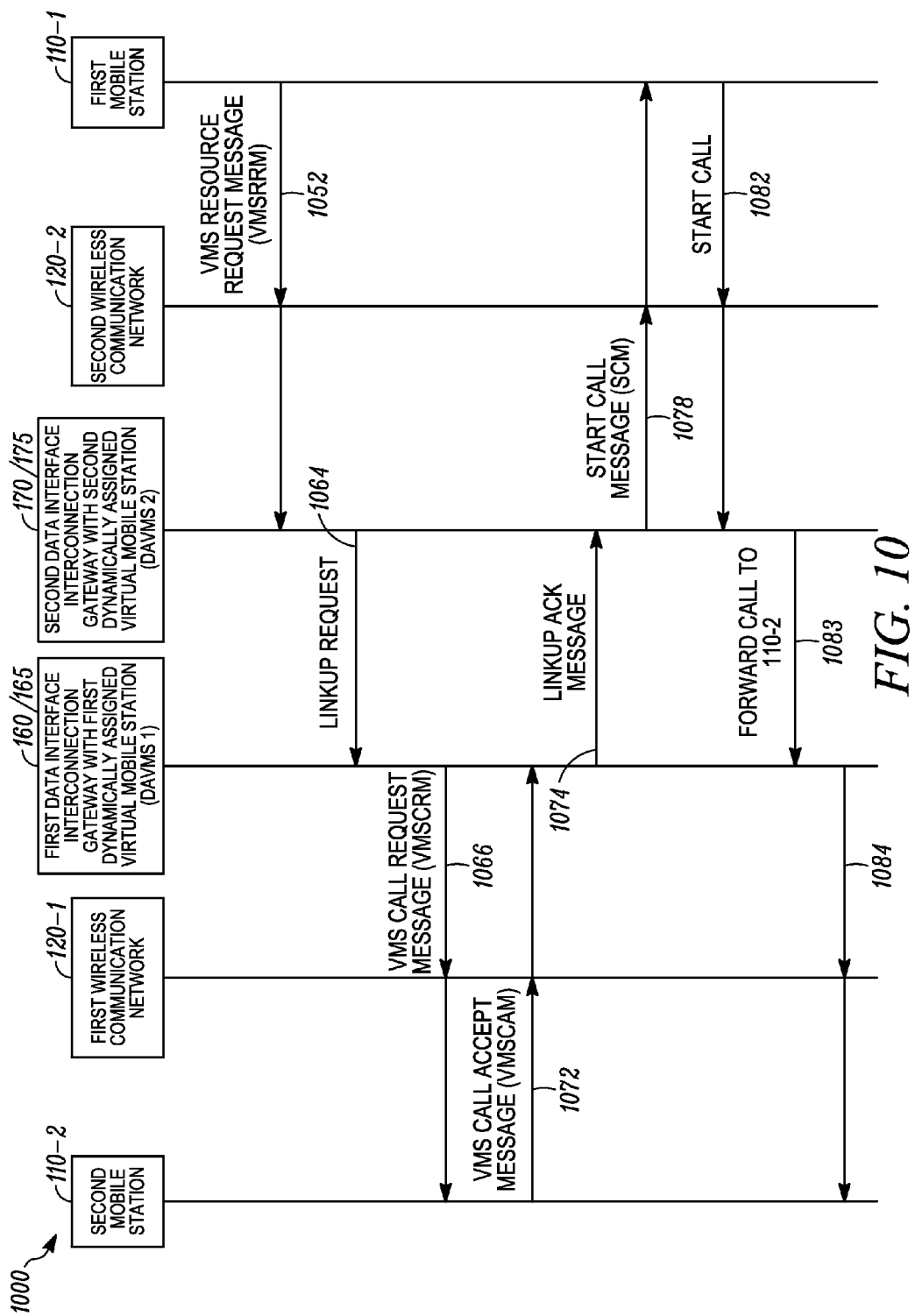
FIG. 10 is a message flow diagram that illustrates setup of a dynamically assigned virtual mobile stations (DAVMS), and call routing between mobile stations in accordance with some other embodiments.

FIG. 10 is a message flow diagram 1000 that illustrates a setup of a dynamically assigned virtual mobile stations (DAVMS) 165, 175, and call routing between mobile stations 110-1, 110-2 in accordance with some embodiments. In FIG. 10, the first mobile station 110-1 has migrated to and is located in the second wireless communication network 120-2 and the second mobile station 110-2 has migrated to and is located in the first wireless communication network 120-1. The first mobile station 110-1 seeks to place a call to the second mobile station 110-2. As will be described below, the DAVMSs 165, 175 are setup on each wireless communication network 120 and can be used by any mobile station that wants to make a call between 120-1 and 120-2. For each path between two networks 120, DAVMSs 165, 175 are dynamically assigned to calls when needed and are setup to represent a path between two networks 120-1, 120-2.

When the first mobile station 110-1 decides to initiate a call to the second mobile station 110-2, the first mobile station 110-1 determines based on a mobility map that the second mobile station 110-2 is associated with the second wireless communication network 120-2 and has migrated to (and is presently located in) the home communication network 120-1 of the first mobile station 110-2. Because the first mobile station 110-1 has migrated to (and is presently located in) a visited communication network 120-2 and the second mobile station 110-2 has migrated to (and is presently located in) a visited communication network 120-1, the first mobile station 110-1 determines that it must communicate with the second mobile station 110-2 through a virtual mobile station 165 that corresponds to the first mobile station 110-1.

The calling mobile station 110-1 and the called mobile station 110-2 learn of the DAVMS resources that are assigned for the call using a DAVMS protocol at 1052-1078. In one implementation, the DAVMS protocol messages at 1052-1078 (that will be described hereinafter) are sent using DLMs.

At 1052, the first mobile station 110-1 sends a VMSRRM to the second DIIGW 170 and the second wireless communication network 120-2. The VMSRRM is sent from the calling party to its local DIIGW 170 to initiate a call and request use of local VMS resources (e.g., DAVMS 1 160) at its local DIIGW 170 for the call. DIIGW 160 and DIIGW 170 must agree on the resources being available on both wireless communication networks (120-1/120-2) before the request can be accepted and a start call message (SCM) sent back to first mobile station 110-1.

In this example, the first DIIGW 160 assigns DAVMS 1 165 to first mobile station 110-1 for use in calling second mobile station 110-2, and the VMSGRM is used to communicate the assignment of DAVMS 1 165 to the calling mobile station 110-1 for use in calling a called mobile station 110-2. The VMSGRM includes a identifier for the DAVMS 1 165 that has been assigned for the call.

As described in other embodiments previously herein, before the call can proceed, location lookups are performed by DIIGW 170 and DIIGW 160 to identify where second called mobile station 110-2 is located. For simplicity, this description will not be repeated here. At 1064, the second DIIGW 170 sends an inter-gateway link up request message (IGLUR) to the first DIIGW 160 to indicate that a call is being setup for between the first/calling mobile station 110-1 to second/called mobile station 110-2. The first DIIGW 160 ensures that enough DAVMSs are available for the call.

At 1066, the DAVMS 1 165 of the second DIIGW 160 sends a VMSCRM to the second mobile station 110-2 so that second mobile station 110-2 is informed that an inbound call will be coming from the DAVMS 1 165. In this manner, the called mobile station 120-2 is warned of an incoming call via the VMSCRM. The VMSCRM includes the identifier of the calling mobile station 120-1, and the identifiers of the calling DAVMS 165 that is assigned for that call. In this manner, the called mobile station 110-2 can identify the calling mobile station 110-1 through DAVMSs 165 that are to be used for the call.

In response, at 1072, the second/called mobile station 110-2 sends a VMSCAM back to the DAVMS 1 165 to confirm or acknowledge (ACK) acceptance of the incoming call from the calling mobile station 110-1.

At 1074, the DAVMS 1 165 sends DAVMS 2 175 a linkup acknowledgement message.

At 1078, the DAVMS 2 175 sends a start call message (SCM) to the first mobile station 110-1 (via the second wireless communication network 120-2 using message 1074) to indicate that the first/calling mobile station 110-1 is permitted to begin the call. The SCM includes the identifier for the called mobile station's 110-2 DAVMS 2 175 that is assigned for that call. The second mobile station 110-2 then has all information needed to begin the call.

At 1082, the first/calling mobile station 110-1 starts the call. The call is sent from the first/calling mobile station 110-1 to the second wireless communication network 120-2, and from the second wireless communication network 120-2 to the DAVMS 2 175 at second DIIGW 170. At 1083, the DAVMS 2 175 forwards the call to the DAVMS 1 165 at the first DIIGW 160. At 1084, the DAVMS 1 165 then forwards or relays the call to the first wireless communication network 120-1. The first wireless communication network 120-1 then communicates the call to the first mobile station 110-1.

Group Call Methods

In accordance with some embodiments, a method is provided for providing group calls through virtual mobile stations implemented at DIIGWs 160, 170 so that group communications can be patched between the two communication networks 120. The virtual mobile station can be locally attached to groups or can directly call target mobile stations that are attached to visited groups. These patches could be done as a direct call to the needed members of the group or could directly patch communications (e.g., audio communications) to predetermined groups that are setup between each communication network 120.

Group Membership Databases

Prior to describing group call methods with reference to FIGS. 11 and 12, databases that are used to track membership of mobile stations in groups will now be described.

These databases include a group Home Location Register (gHLR) and a group Visitor Location Register (gVLR) that are unique to each cell (e.g., as defined by a particular base station) of a particular wireless communication network. The gVLR and gHLR are used to maintain a list of mobile stations which are members of a specific group. Each group is identified by a group identifier and a list of particular mobile stations that are members of the group associated with that particular group identifier. The gHLR stores group membership lists, whereby each is a list of mobile stations serviced by the group. The gVLR stores visiting groups where the group gHLR for the group is located and the members in the current SwMI which are affiliated with the visted group for a particular cell. Each cell (not illustrated in FIGS. 11 and 12) that is part of the first wireless communication network 120-1 and each cell (not illustrated in FIGS. 11 and 12) that is part of the second wireless communication network 120-2 has its own gHLR and gVLR databases to keep track of mobile stations that belong to different groups. In other words, the gHLR and gVLR databases for each cell of the first wireless communication network 120-1 are exclusive to that cell, and the gHLR and gVLR databases for each cell of the second wireless communication network 120-2 are exclusive to that cell. Data is not replicated and shared between cells inside of a wireless communication network.

A mobile station that visits a wireless communication network will bring some groups with it that are not provisioned at the wireless communication network. To identify membership devices for specific groups, a second type or set of databases is used that includes a group Home Database (gHDB) and a group Visitor Database (gVDB).

Figure 11:
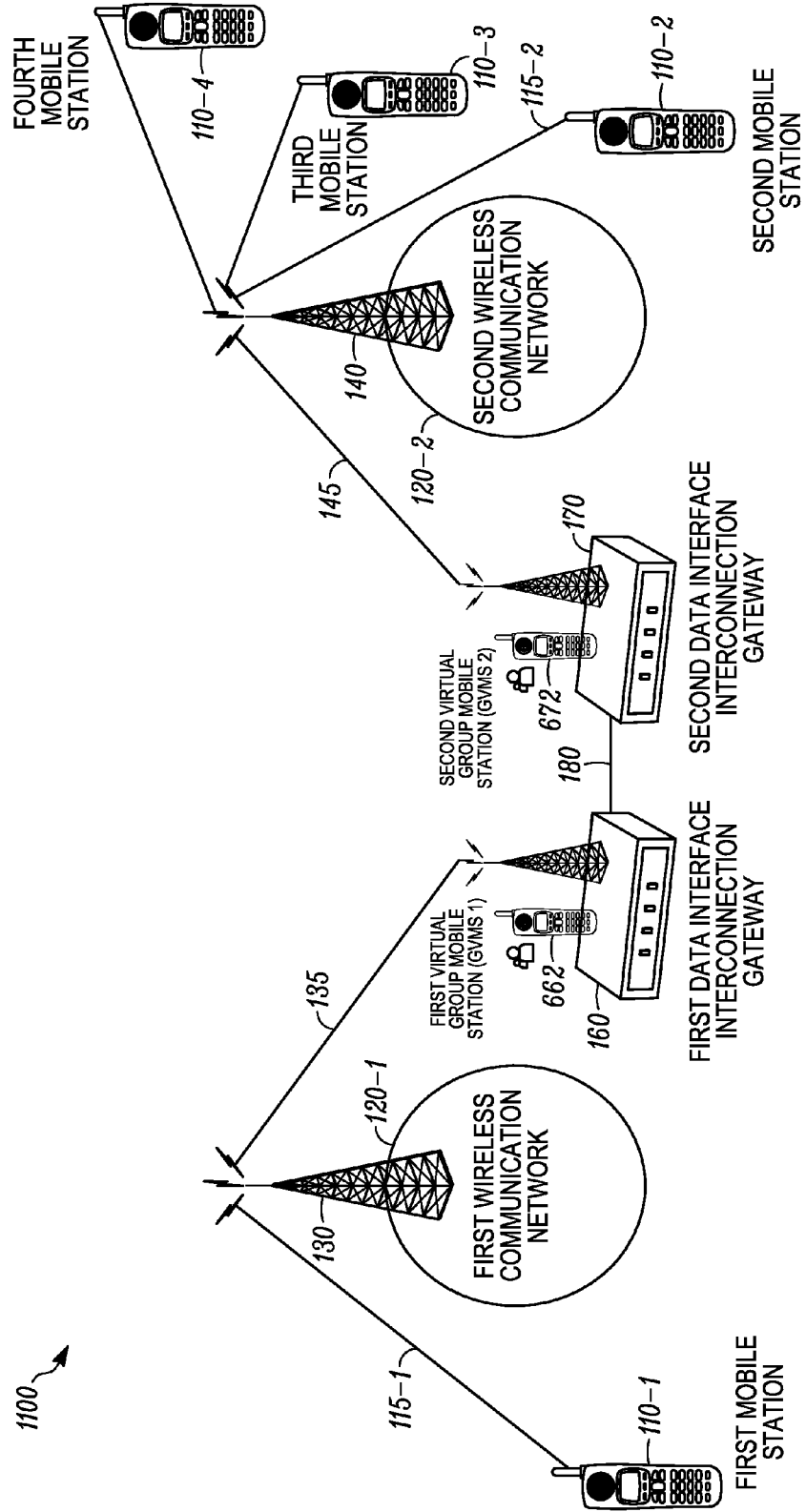
FIG. 11 is a group call communication system when there is no migration of mobile stations away from their home wireless communication networks in accordance with some other embodiments.

FIG. 11 is a group call communication system 1100 when there is no migration of mobile stations away from their home wireless communication networks in accordance with some embodiments. In other words, in FIG. 11 all mobile stations are located at and registered with their home wireless communication networks 120-1, 120-2. The infrastructure equipment of first wireless communication network 120-1 and second wireless communication network 120-2 both support group call functionality.

To illustrate a group call method when none of the mobile stations has migrated, a scenario will now be described that involves a group call between the first mobile station 110-1, a mobile station 110-3 that is located at and registered with the second wireless communication network 120-2, a mobile station 110-4 that is located at and registered with the second wireless communication network 120-2, and a group virtual mobile station (GVMS) 662 that is registered at first wireless communication network 120-1 by DIIGW 160. The GVMS 662 affiliates itself with the groups present at the first wireless communication network 120-1 which need to have their group communications bridged across to the second communication network 120-2. In this example, the second mobile station 110-2 is not involved since it is not a member of the group selected by first mobile station 110-1 for the group call.

The first mobile station 110-1 initiates a group call by sending a group call request message (GCRM) to the first wireless communication network 120-1 over a wired or wireless interface, and the first wireless communication network 120-1 determines a list of mobile stations that correspond to the group (or the "group membership") for this call by looking it up in the gHLR. In this particular example, the list or group membership includes the first mobile station 110-1 and the GVMS 162.

For each group the DIIGW 160 maintains a membership list database that includes, for each particular group, a set of wireless communication networks will be involved in a particular group call. To be included in the set of wireless communication networks that will be involved in a particular group call, a wireless communication network must currently have at least one mobile station registered with it that is also a member of the group. A mobile station that is a member of the group will be referred to herein as a group mobile station. Thus, for a particular wireless communication network to be included in the set, a group mobile station must be present at that particular wireless communication network. As such, the wireless communication networks included in this set changes depending on which wireless communication networks currently have one or more of the group mobile stations present at any given time. In this example, it is assumed that the only two networks included in the set are the first wireless communication network 120-1 and the second wireless communication network 120-2 since these networks are the only two that currently have group members present.

The first DIIGW 160 determines that the set of wireless communication networks includes one additional wireless communication network 120-2. As such, the first DIIGW 160 uses the GVMS 662 to communicate the group call request to the second DIIGW 170. The second DIIGW 170 includes a GVMS 672 that communicates the group call request to the second wireless communication network 120-2, which then communicates the group call request to the group mobile stations 110-3, 110-4. As members of the group, the group mobile stations 110-3, 110-4 are waiting for group call requests from GVMS 672 and will receive them.

Figure 12:
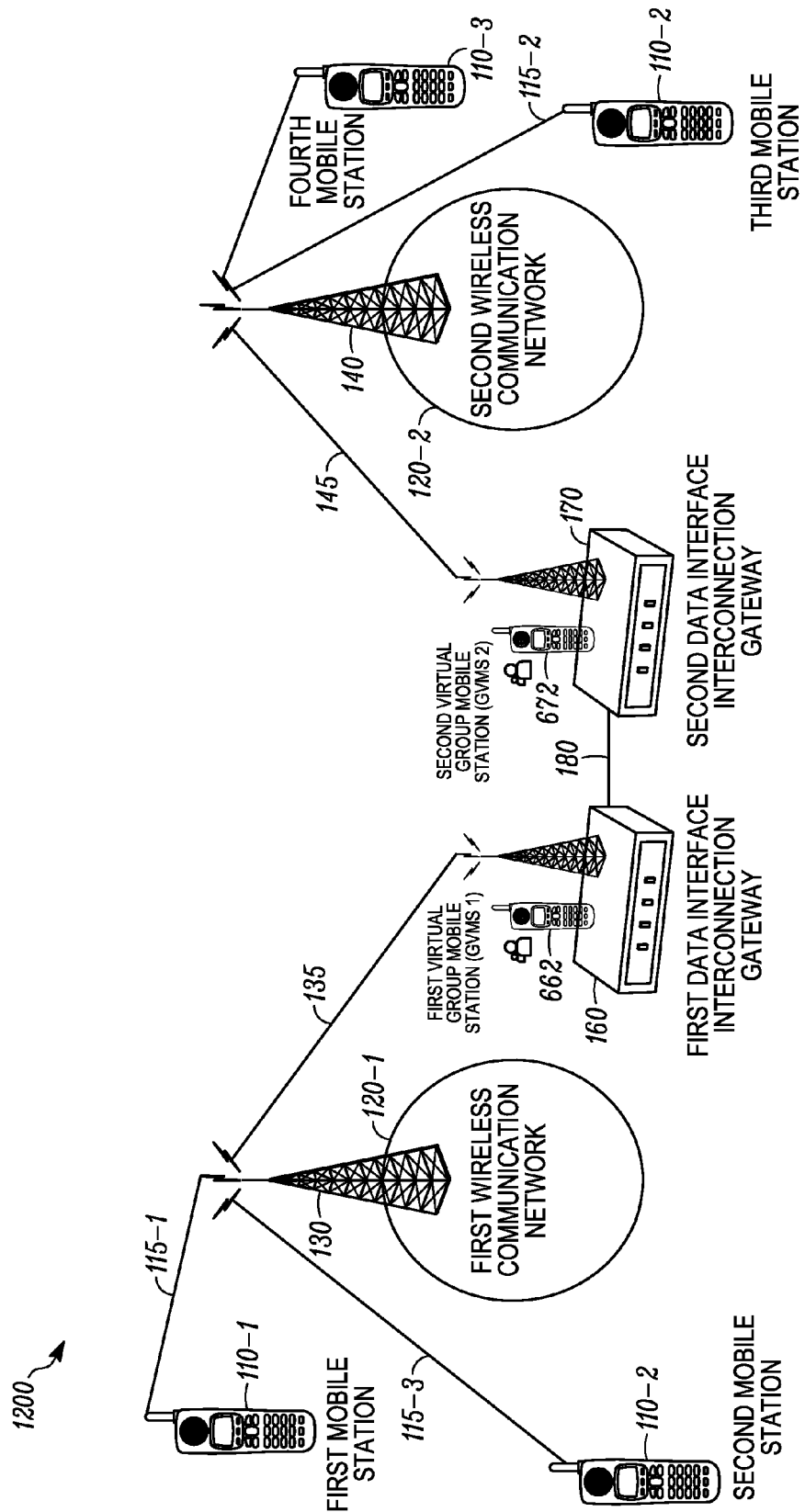
FIG. 12 is the group call communication system of FIG. 11 after a second mobile station migrates away from its home wireless communication network to a first communication network in accordance with some embodiments.

FIG. 12 is a group call communication system 1200 of FIG. 11 after the second mobile station 110-2 migrates away from its home wireless communication network 120-2 to the first communication network 120-1 in accordance with some embodiments. In other words, in FIG. 11 the mobile stations 110-1, 110-3, 110-4 are each located at and registered with their home wireless communication networks 120-1, 120-2, but mobile station 110-2 has migrated to and registered with wireless communication network 120-1. As in FIG. 11, the infrastructure equipment of first wireless communication network 120-1 and second wireless communication network 120-2 both support group call functionality.

To illustrate another group call method when one of the mobile stations 110-2 has migrated, a scenario will now be described that involves a group call from mobile station 110-2 to groups at second wireless communication network 120-2 that are not present at first wireless communication network 120-1. In this embodiment, the second mobile station 110-2 will affiliate, possibly though a manual or automatic switch method, to a group which is setup for use by DIIGW 160 and virtual group mobile 662 for use to "bridge" between wireless communication network 120-1 and wireless communication network 120-2. DIIGW 170 will be forwarded all group air traffic by DIIGW 160, completing the bridge. The bridging group can be dynamically assigned and given to second mobile station 110-2 in DLM from DIIGW 160, or can be pre-setup in first wireless communication network 120-1.

The second mobile station 110-2 would like to call base to second wireless communication network 120-2 using the bridging group. To do this, the second mobile station 110-2 calls the bridging group at first wireless communication network 120-1 which includes GVMS 662 as a member. GVMS 662 forwards the group call to DIIGW 160, and as before DIIGW 160 switches the group call to DIIGW 170 based on information in the membership list database. DIIGW 170 sends the group call over link 145 via GVMS 672. If a group call is already ongoing when this happens at second wireless communication network 120-2, then a pre-emption rule, higher priority setting on the call, or other similar method can be setup in second wireless communication network 120-2 whereby GVMS 672 has the highest priority, ending the call at second wireless communication network 120-2. If mobile station 110-2 has migrated back to the second wireless communication network 120-2 while it is sourcing the communication, the call will be dropped when it comes into second wireless communication network 120-2 or can be restored using software in second mobile station 110-2 whereby the mobile station 110-2 starts a new call in second wireless communication network 120-2 on the mapped group that second mobile station 110-2 was using at first wireless communication network 120-1

To illustrate another group call method when mobile station 110-2 has migrated to the first wireless communication network 120-1, a scenario will now be described that involves a group call from mobile station 110-4 at the second wireless communication network 120-2 to groups at the second wireless communication network 120-2 and the second mobile station 110-2 located at the first wireless communication network 120-1. When mobile station 110-4 prepares to make a group call to second wireless communication network 120-2, the corresponding group call request is forwarded to GVMS 672 in second wireless communication network 120-2 since GVMS 672 is also a member of this group. GVMS 672 forwards the group call request to DIIGW 170 via link 145, and DIIGW 170 forwards the group call to DIIGW 160 via link 180. DIIGW 160 determines, based on mobility information, that a group mobile station 110-2 is located at and registered with the first wireless communication network 120-1. As such, DIIGW 160 sets up GVMS 662. GVMS 662 calls a general mapped group in the first wireless communication network 120-1 (on behalf of the source group in the second wireless communication network 120-2), and the second mobile station 110-2 will then receive the group call request via the first wireless communication network 120-1.

If mobile station 110-2 has migrated back to the second wireless communication network 120-2 while it is involved in a group call with second wireless communication network 120-2 where the group call is being sourced from mobile station 110-3, the DIIGW 160 will be updated with the migration information via DIIGW 170. DIIGW 160 will stop providing the group call information to GVMS 662 thereby stopping the group call at first wireless communication network 120-1.

Figure 13:
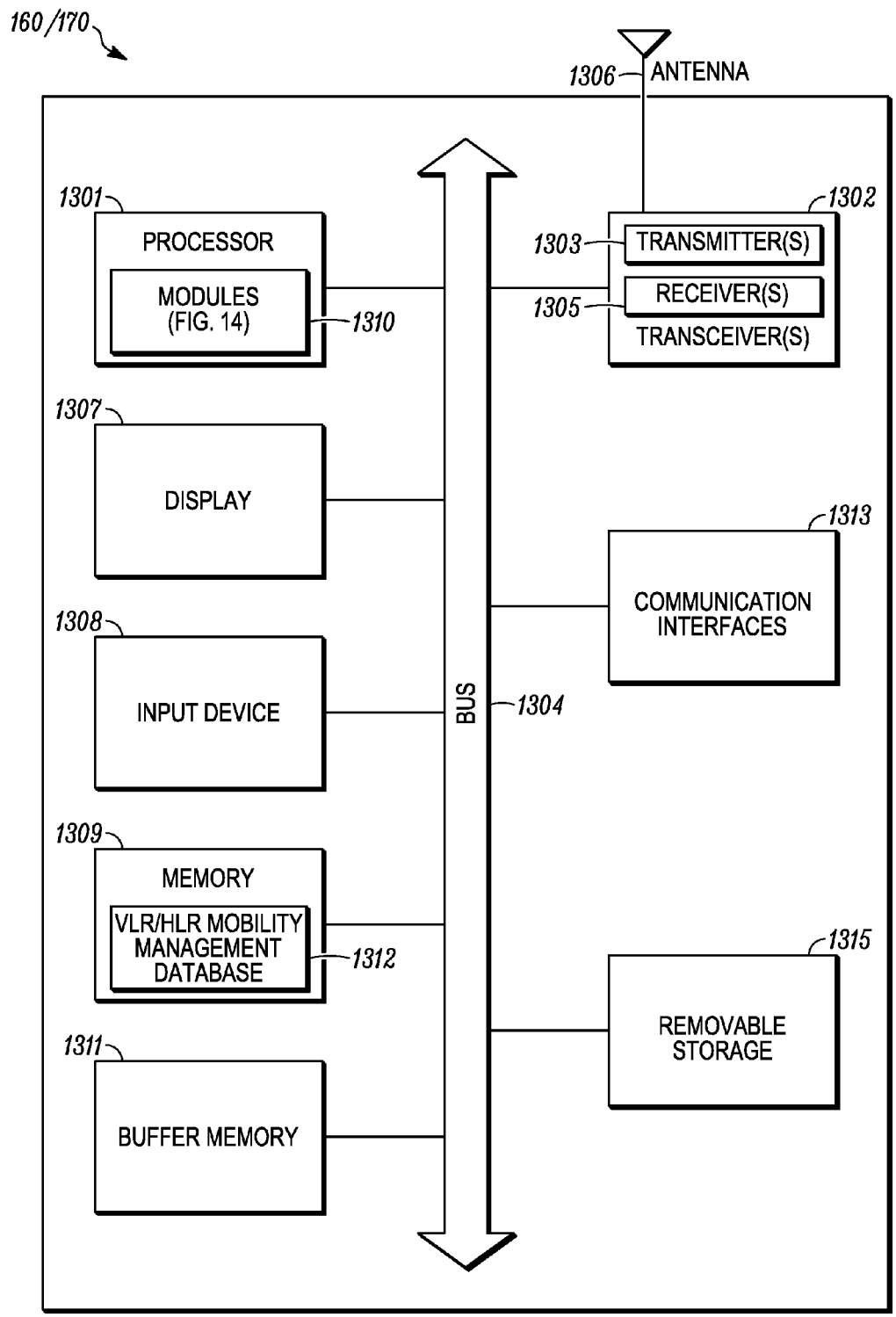
FIGS. 13 and 14 are block diagrams of a data interface interconnection gateway (DIIGW) in accordance with some embodiments.
Figure 14:
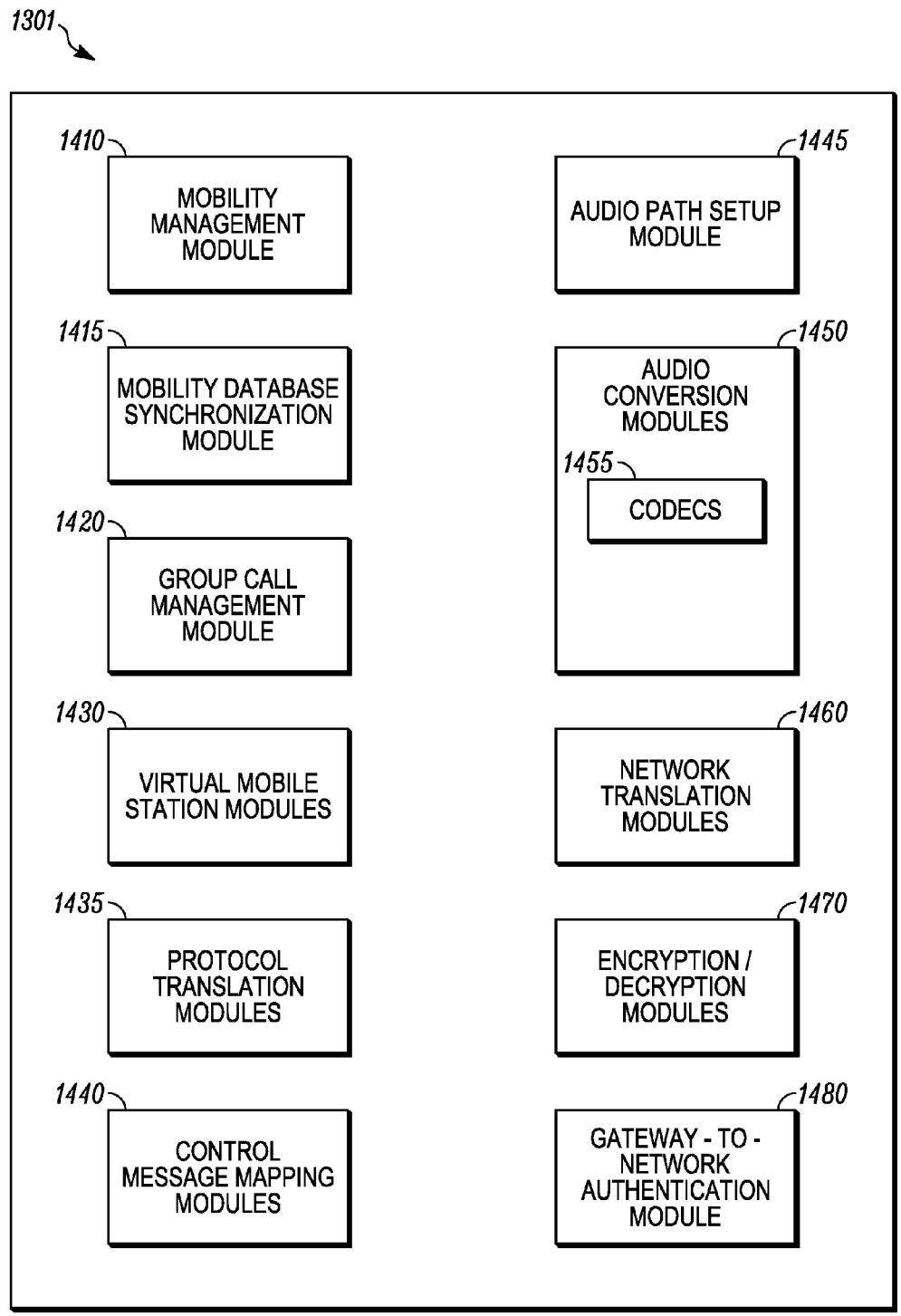

One possible implementation of a DIIGW will now be described with reference to FIGS. 13 and 14. FIG. 13 is a block diagram of a data interface interconnection gateway (DIIGW) 160/170 in accordance with some of the disclosed embodiments. FIG. 14 is a block diagram of additional modules that can be implemented at the processor of the data interface interconnection gateway (DIIGW) 160/170 in FIG. 13. The DIIGW 160/170 comprises a processor 1301, a transceiver 1302 including a transmitter circuitry 1303 and a receiver circuitry 1305, an antenna 1306, a display 1307, an input device 1308, a memory 1309 for storing operating instructions that are executed by the processor 1301, a buffer memory 1311, one or more communication interfaces 1313, and a removable storage unit 1315. The processor 1301 includes addition modules as illustrated in FIG. 14.

The processor 1301 can include one or more microprocessors, microcontrollers, DSPs (digital signal processors), state machines, logic circuitry, or any other device or devices that process information based on operational or programming instructions. Such operational or programming instructions can be, for example, stored in the memory 1309.

As will be described in greater detail below, the processor 1301 can include a mobility management module 1410 and a mobility database synchronization module 1415 that are used to perform mobility processing for determining the location of mobile stations as described above. The mobility management module 1410 manages data stored in the VLR/HLR mobility management database 1412 and allows the DIIGW to determine the current communication network location of each mobile station. The mobility database synchronization module 1415 allows the DIIGW 160/170 to regularly synchronize its VLR/HLR mobility management database 1412 with those maintained by other DIIGWs.

The processor 1301 can also include a group call management module 1420 that is used perform group call processing that is described above with reference to FIGS. 11 and 12.

In addition, the processor 1301 can also include various modules that are used to implement the virtual mobile station module(s) 1430. In some embodiments, the virtual mobile station module(s) 1430 utilize protocol translation modules 1435, control message mapping modules 1440, a call path set up module 1445 for setting up communication paths between communication networks, audio conversion modules 1450 comprising CODECs 1455 required to perform coding and decoding conversion between two or more different types of wireless communication networks, network translation modules 1460, encryption/decryption modules 1470 that perform encryption/decryption and that include memory for storing context information for the encryption process including identifiers for particular encryption/decryption algorithms that are utilized, encryption keys, etc., and a gateway-to-communication network authentication module 1480 that are used to facilitate communication between communication networks and to support call processing when communicating between networks. Depending on the implementation, any of the modules in FIG. 14 can be implemented at the DIIGW or a VMS implemented at the DIIGW.

The memory 1309 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing non-transitory digital information. Among other things, the memory 1309 includes a VLR/HLR mobility management database 1312 to keep track of which communication network each mobile station is presently associated with or registered with. The VLR/HLR mobility management database 1312 includes the information that allows the DIIGW to determine the current communication network where each mobile station is located.

One of ordinary skill in the art will recognize that when the processor 1301 has one or more of its functions performed by a state machine or logic circuitry, the memory 1309 containing the corresponding operational instructions may be embedded within the state machine or logic circuitry. The operations performed by the processor 1301 and the rest of the DIIGW 160/170 as described above.

The DIIGW 160/170 includes a plurality of transceivers 1302 that are used to communicate with each type of infrastructure equipment that the DIIGW is capable of being coupled to, and in some implementations the DIIGW 160/170 includes one or more transceivers 1302 that are used to communicate with one or more other DIIGW(s) that is/are part of one or more visited communication network(s). In some implementations, some or all of the transceivers can be implemented via radio modules. Each radio can be implemented using the processor, memory, and a transceiver that includes at least one set of transmitter circuitry and receiver circuitry. For sake of convenience, the transceiver(s) are collectively shown in one block. The implementations of the transmitter circuitry 1303 and the receiver circuitry 1305 depend on the implementation of the DIIGW 160/170 and can be implemented as part of a hardware and software architecture in accordance with known techniques. Most, if not all, of the functions of the transmitter circuitry 1303 and/or the receiver circuitry 1305 may be implemented in a processor or processors, such as the processor 1301. However, the processor 1301, the transmitter circuitry 1303, and the receiver circuitry 1305 have been artificially partitioned herein to facilitate a better understanding.

At least one set of the transmitter circuitry 1303 and the receiver circuitry 1305 enables the DIIGW 160/170 to communicate information to and acquire information from the base stations that are part of a communication network. The transmitter circuitry 1303 and the receiver circuitry 1305 can operate in conjunction with virtual mobile station modules 1430 to enable the DIIGW 160/170 to act as one or more virtual mobile station(s). In some implementations, the transmitter circuitry 1303 and the receiver circuitry 1305 include conventional circuitry to enable digital or analog transmissions over a wireless communication channel sometimes referred to as an air interface. In most embodiments, the transmitter circuitry will resemble the circuitry used by the mobile station(s) but will include support to allow for multiple connections with the base station.

In implementations where the receiver circuitry 1305 is designed to communicate over an air interface, receiver circuitry 1305 is capable of receiving radio frequency (RF) signals from at least one and in some cases multiple bandwidths. The receiver circuitry 1305 may optionally comprise a first receiver and a second receiver, or one receiver capable of receiving in two or more bandwidths. Each transceiver 1302 includes at least one set of transmitter circuitry 1303. The transmitter circuitry 1303 may be capable of transmitting to multiple devices on multiple frequency bands.

The antenna 1306 comprises any known or developed structure for radiating and receiving electromagnetic energy in the frequency range containing the wireless carrier frequencies. Although not shown, the gateway 160/170 also can include an antenna switch, duplexer, circulator, or other highly isolative means (not shown) for intermittently providing information bursts or packets from the transmitter circuitry 1303 to the antenna 1306 and from the antenna 1306 to the receiver circuitry 1305.

The buffer memory 1311 may be any form of volatile memory, such as RAM, and is used for temporarily storing received information packets in accordance with some embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, comprising:
communicating a first network location inquiry message from a first gateway, bridging a first wireless communication network to a second wireless communication network, to a first base station that belongs to the first wireless communication network, wherein the first network location inquiry message is destined for a first mobile station that has the first wireless communication network as its home wireless communication network;
communicating a second network location inquiry message, different from the first network location inquiry message, from a second gateway, bridging the second wireless communication network to the first wireless communication network, to a second base station that belongs to the second wireless communication network, different from the first wireless communication network, wherein the second network location inquiry message is destined for the first mobile station that has the second wireless communication network as a possible visited wireless communication network;
transmitting the first network location inquiry message from the first base station and the second network location inquiry message from the second base station to the first mobile station;
communicating, in response to one of the first network location inquiry message and the second network location inquiry message, an acknowledgment message from the first mobile station to the gateway;
determining, at the first gateway, that the first mobile station is registered with the first wireless communication network when the acknowledgment message is communicated to the first gateway via the first base station in response to the first network location inquiry message; and determining, at the second gateway, that the first mobile station is registered with the second wireless communication network when the acknowledgment message is communicated to the gateway via the second base station in response to the second network location inquiry message, and responsively:
i) transmitting a notice from the second gateway to the first gateway informing the first gateway of a presence of the first mobile station in the second wireless communication network; and
ii) responsive to receiving the notice, the first gateway providing a first virtual mobile station at the first gateway through which all incoming and outgoing calls with the first mobile station at its location in the second wireless communication network will be routed.

2. A method according to claim 1, wherein the first mobile station has a first unique identifier that identifies the first mobile station, and wherein the first virtual mobile station that corresponds to the first mobile station has a second unique identifier that identifies the first virtual mobile station.

3. A method according to claim 2, when the second gateway determines that the first mobile station is located at and registered with the second wireless communication network, further comprising:
receiving, at the first wireless communication network, information that is destined for the first mobile station;
sending the information from the first wireless communication network to the first virtual mobile station;
forwarding the information from the first virtual mobile station to the second wireless communication network; and
forwarding the information from the second wireless communication network to the first mobile station.

4. A method according to claim 2, when the gateway determines that the first mobile station is located at and registered with the second wireless communication network, further comprising:
receiving information that originates from the first mobile station at the second wireless communication network, wherein the information is destined for the first wireless communication network;
forwarding the information from the second wireless communication network to the first virtual mobile station at the first gateway; and
forwarding the information from the first virtual mobile station to the first wireless communication network.

5. A method according to claim 1, wherein the first base station and the first mobile station communicate with each other in accordance with a first air interface protocol, and wherein the second wireless communication network further comprises a second mobile station that communicates with the second base station in accordance with a second air interface protocol.

6. A method according to claim 5, wherein the first air interface protocol and the second air interface protocol are different.

7. A method according to claim 6, wherein the first gateway is in communication with the first base station in accordance with the first air interface protocol and the second gateway is in communication with the second base station in accordance with the second air interface protocol.

8. A method according to claim 5, wherein the second mobile station has a third unique identifier that identifies the second mobile station, and wherein the second gateway includes a second virtual mobile station that corresponds to the second mobile station, wherein the second virtual mobile station has a fourth unique identifier that identifies the second virtual mobile station.

9. A method according to claim 1, wherein the first network location inquiry message and the second network location inquiry message are communicated over a standardized air interface in accordance with a standardized air interface protocol using a data service that implements an acknowledgement mechanism, wherein the data service is one of: a short data service (SDS), a TErrestrial Trunked RAdio (TETRA) high speed data service (TEDS), a TETRA packet data service, a short message service (SMS), general packet radio service (GPRS), a text messaging service or a wireless network location inquiry service.

10. The method of claim 3, wherein the information is a new call notification indicating the first mobile station as a target of the new call.

11. The method of claim 4, wherein the information is a new call request originating from the first mobile station.

12. The method of claim 1, when the first gateway determines that the first mobile station is located at and registered with the first wireless communication network, the second wireless communication network storing the second network location inquiry message for delivery to the first mobile station once the first mobile station registers with the second wireless communication network.

13. The method of claim 1, wherein the first gateway communicates with the first wireless communication network using a same air interface protocol as used by the first mobile station to communicate with the first wireless communication network, and wherein the second gateway communications with the second wireless communication network using a same second air interface protocol as used by the first mobile station to communicate with the second wireless communication network.

14. A communication system, comprising:
a first wireless communication network comprising a first base station and a first mobile station that communicate in accordance with a first air interface protocol;
a second wireless communication network, different from the first wireless communication network, comprising a second base station and a second mobile station that communicate in accordance with a second air interface protocol;
a first data interface interconnection gateway (DIIGW) bridging the first wireless communication network to the second wireless communication network and in communication with the first base station and with the second base station, wherein the first DIIGW communicates a first network location inquiry message destined for the first mobile station via the first base station;
a second DIIGW bridging the second wireless communication network to the first wireless communication network and in communication with the first base station and with the second base station, wherein the second DIIGW communicates a second network location inquiry message, different from the first network location inquiry message, destined for the first mobile station via the second base station,
wherein the first DIIGW determines that the first mobile station, which has the first wireless communication network as its home wireless communication network, is registered with the first wireless communication network when the first mobile station communicates an acknowledgment message to the first DIIGW in response to the first network location inquiry message,
wherein the second DIIGW determines that the first mobile station, which has the second wireless communication network as a possible visited wireless communication network, is registered with the second wireless communication network when the first mobile station communicates a second acknowledgment message to the second DIIGW in response to the second network location inquiry message;
wherein the second DIIGW, responsive to determining that the first mobile station is registered with the second wireless communication network, transmits a notice to the first gateway informing the first gateway of a presence of the first mobile station in the second wireless communication network; and
wherein the first DIIGW, responsive to receiving the notice, provides a first virtual mobile station at the first DIIGW through which all incoming and outgoing calls with the first mobile station at its location in the second wireless communication network will be routed.

15. A communication system according to claim 14, when the second DIIGW determines that the first mobile station is located at and registered with the second wireless communication network, communications sent to the first mobile station that originate in the first wireless communication network are communicated from the first wireless communication network to the first virtual mobile station at the first DIIGW, forwarded from the first virtual mobile station to the second wireless communication network, and then forwarded from the second wireless communication network to the first mobile station.

16. A communication system according to claim 14, wherein when the second DIIGW determines that the first mobile station is located at and registered with the second wireless communication network, communications that originate from the first mobile station at the second wireless communication network and that are destined to the first wireless communication network are communicated to the second wireless communication network, forwarded from the second wireless communication network to the first virtual mobile station at the first DIIGW, and then forwarded from the first virtual mobile station to the first wireless communication network.

17. The communication system according to claim 14, wherein the information is a new call notification indicating the first mobile station as a target of the new call.

18. The communication system according to claim 14, wherein the information is a new call request originating from the first mobile station.

19. The communication system according to claim 14, wherein when the first DIIGW determines that the first mobile station is located at and registered with the first wireless communication network, the second wireless communication network stores the second network location inquiry message for delivery to the first mobile station once the first mobile station registers with the second wireless communication network.

20. The communication system according to claim 14, wherein the first DIIGW includes a first transceiver configured to communication communicate with the first wireless communication network using a same air interface protocol as used by the first mobile station to communicate with the first wireless communication network, and wherein the second DIIGW includes a second transceiver configured to communication with the second wireless communication network using a same second air interface protocol as used by the first mobile station to communicate with the second wireless communication network.

* * * * *

UNITED STATES PATENT AND TRADEMARK OFFICE
CERTIFICATE OF CORRECTION

| | |
|---|---|
| PATENT NO. | : 8,326,289 B2 |
| APPLICATION NO. | : 12/789673 |
| DATED | : December 4, 2012 |
| INVENTOR(S) | : Gunder |

It is certified that error appears in the above-identified patent and that said Letters Patent is hereby corrected as shown below:

In the Claims:

In Column 28, Line 17, in Claim 15, delete "A communication" and insert -- The communication --, therefor.

In Column 28, Line 28, in Claim 16, delete "A communication" and insert -- The communication --, therefor.

Signed and Sealed this
Twenty-third Day of April, 2013

Teresa Stanek Rea
*Acting Director of the United States Patent and Trademark Office*